(12) United States Patent
Lin

(10) Patent No.: US 6,528,557 B2
(45) Date of Patent: Mar. 4, 2003

US006528557B2

(54) INKS COMPRISING LINEAR ASBS'A' BLOCK COPOLYMERS OF ALKYLENE OXIDE AND SILOXANE

(75) Inventor: John Wei-Ping Lin, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/776,515

(22) Filed: Feb. 2, 2001

(65) Prior Publication Data

US 2002/0151619 A1 Oct. 17, 2002

(51) Int. Cl.⁷ .................. C09D 11/10; C08L 83/10; C08L 83/12; C08G 77/42; C08G 77/46
(52) U.S. Cl. .................. 523/160; 524/505; 524/506; 528/25; 528/27; 528/29; 528/43
(58) Field of Search .................. 523/160, 161; 106/31.27, 31.28, 31.6; 524/505, 506; 556/444, 445, 446; 568/606; 528/25, 27, 29, 43

(56) References Cited

U.S. PATENT DOCUMENTS

| | | | |
|---|---|---|---|
| 4,384,976 A | * 5/1983 | Grunert et al. | 516/124 |
| 5,141,556 A | 8/1992 | Matrick | 106/20 |
| 5,160,372 A | 11/1992 | Matrick | 106/19 R |
| 5,169,438 A | 12/1992 | Matrick | 106/22 R |
| 5,180,425 A | 1/1993 | Matrick et al. | 106/22 R |
| 5,205,861 A | 4/1993 | Matrick | 106/20 D |
| 5,221,334 A | 6/1993 | Ma et al. | 106/20 D |
| 5,356,464 A | 10/1994 | Hickman et al. | 106/20 R |
| 5,486,549 A | 1/1996 | Itagaki et al. | 523/161 |
| 5,531,818 A | * 7/1996 | Lin | 106/31.28 |
| 5,555,008 A | 9/1996 | Stoffel et al. | 347/100 |
| 5,580,373 A | 12/1996 | Lane et al. | 106/20 R |
| 5,623,296 A | 4/1997 | Fujino et al. | 347/103 |
| 5,648,405 A | 7/1997 | Ma et al. | 523/160 |
| 5,709,737 A | * 1/1998 | Malhotra et al. | 106/31.43 |
| 5,714,538 A | 2/1998 | Beach et al. | 524/504 |
| 5,719,204 A | 2/1998 | Beach et al. | 523/161 |
| 5,750,592 A | 5/1998 | Shinozuka et al. | 523/161 |
| 5,772,746 A | 6/1998 | Sawada et al. | 106/31.86 |
| 5,782,965 A | * 7/1998 | Ishida et al. | 106/31.33 |
| 5,852,075 A | 12/1998 | Held | 523/161 |
| 5,888,287 A | 3/1999 | Brown et al. | 106/31.58 |
| 6,033,463 A | * 3/2000 | Yui et al. | 106/31.27 |
| 6,124,376 A | 9/2000 | Nichols et al. | 523/160 |

FOREIGN PATENT DOCUMENTS

| | | | |
|---|---|---|---|
| EP | 769536 A2 | * 4/1997 | |
| JP | 10310732 A | * 11/1998 | |

OTHER PUBLICATIONS

English Translation of JP 10310732 (1998).*

* cited by examiner

Primary Examiner—Vasu Jagannathan
Assistant Examiner—Callie E. Shosho
(74) Attorney, Agent, or Firm—Judith L. Byorick

(57) ABSTRACT

Disclosed is an ink composition comprising water, a colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks. Also disclosed is a multicolor ink jet printing process using the ink, wherein dry time is reduced and/or intercolor bleed is reduced.

19 Claims, No Drawings

INKS COMPRISING LINEAR ASBS'A' BLOCK COPOLYMERS OF ALKYLENE OXIDE AND SILOXANE

Cross-reference is made to copending application U.S. Ser. No, 09/775,853, filed concurrently herewith, entitled "Inks Comprising Linear ABSCS'B'A' or BASCS'A'B' Alkylene Oxide/Siloxane Block Copolymers," with the named inventor John Wei-Ping Lin, the disclosure of which is totally incorporated herein by reference.

BACKGROUND OF THE INVENTION

The present invention is directed to ink jet ink compositions and ink jet printing processes. More specifically, the present invention is directed to aqueous ink compositions particularly suitable for the production of high quality images on print substrates. One embodiment of the present invention is directed to an ink composition comprising water, a colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks. Another embodiment of the present invention is directed to a set of inks for printing multicolor images in an ink jet printer, said ink set comprising (1) a first ink having a first color and comprising water and a first colorant; and (2) a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks, wherein dry time of the ink containing the block copolymer is decreased and/or intercolor bleed between the first ink and the second ink is reduced when the second ink is printed adjacent to, on top of, or underneath the first ink on a print substrate. Yet another embodiment of the present invention is directed to a multicolor ink jet printing process which comprises: (1) incorporating into an ink jet printer a first ink having a first color and comprising water and a first colorant; (2) incorporating into the ink jet printer a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks; (3) causing droplets of the first ink to be ejected in an imagewise pattern onto a substrate; and (4) causing droplets of the second ink to be ejected in an imagewise pattern onto the substrate, wherein dry time of the ink containing the block copolymer is decreased and/or intercolor bleed between the first ink and the second ink is reduced when the second ink is printed adjacent to, on top of, or underneath the first ink on the substrate.

Ink jet printing is a non-impact printing method which produces droplets of ink that are deposited on a print substrate in response to electronic digital data signals. Ink jet systems generally are of two types: continuous stream and drop-on-demand. In continuous stream ink jet systems, ink is ejected in a continuous stream under pressure through at least one orifice or nozzle. The stream of ink is periodically perturbed by pressure regulation in accordance with digital signals, causing it to break up into droplets at a fixed distance from the nozzle. At the break-up point, the charged ink droplets pass through an electrical field which adjusts the trajectory of each ink droplet to direct it to a gutter for ink circulation or to a specific location on a print substrate to produce an image. In a drop-on-demand system, an ink droplet is expelled from a nozzle directly onto a print substrate in accordance with digital data signals. Generally, a droplet is not formed or expelled unless it is to be placed on a print substrate.

Drop-on-demand systems are simpler than continuous stream systems since they do not require ink recovery, charging, or deflection. There are three types of drop-on-demand ink jet systems. One type of drop-on-demand system has an ink-filled channel or passageway having a nozzle on one end and a piezoelectric transducer near the other end to produce pressure pulses according to digital data signals. Multiple ink nozzles are used to deliver ink droplets onto a print substrate in an imagewise fashion. Several printheads and inks are used in a multicolor piezoelectric ink jet printing system. High resolution images can be obtained with this system. Examples of this system include the Epson 600, 800, and 1200 Ink Jet printers.

Another type of drop-on-demand ink jet printing system is called acoustic ink jet printing, which can be operated at high frequency and high resolution. Acoustic ink jet printing uses a focused acoustic beam formed with a spherical lens illuminated by a plane wave of sound created by a piezoelectric transducer. The focused beam reflected from a surface exerts a pressure onto the surface of the liquid ink, resulting in ejection of small droplets of ink onto a print substrate. An array of nozzles and corresponding transducers are used in an acoustic ink jet printing process to produce images on a print substrate in an imagewise fashion. Different types and configurations of acoustic printheads and substrate arrangements are possible. In a multicolor ink jet printing process, several acoustic ink jet printheads are used to deliver different inks onto a print substrate. Aqueous inks can be used in this drop-on-demand acoustic ink jet printing system. Examples of acoustic ink jet printing systems are disclosed in, for example K. A. Krause, "Focusing Ink Jet Head," *IBM Technical Disclosure Bulletin*, Vol 16, No. 4, September 1973, pp. 1168–1170, and in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Another type of drop-on-demand printing system is thermal ink jet printing. Thermal or bubble jet drop-on-demand ink jet printers have found broad applications as output for personal computers in the office and in the home. In thermal ink jet printing processes, the printhead typically comprises one or more ink jet ejectors, as disclosed in, for example, U.S. Pat. Nos. 4,601,777, 4,532,530, 4,412,224, 4,410,899, 4,251,824, 4,532,530, 4,601,777, 4,840,674, 5,145,518, 5,281,261, and 5,531,818, the disclosures of each of which are totally incorporated herein by reference. Each ejector includes a channel communicating with an ink supply chamber, or manifold, at one end and an opening at the opposite end, referred to as a nozzle. A thermal energy generator, usually a resistor, is located in each of the channels at a predetermined distance from the nozzles. The resistors are individually addressed with a current pulse to vaporize the ink momentarily within the respective channel to form a bubble that expels an ink droplet. As the bubble grows, the ink rapidly bulges from the nozzle and is momentarily contained by the surface tension of the ink as a meniscus. This phenomenon is temporary, and the ink is quickly propelled toward a print substrate. As the bubble begins to collapse, the ink still in the channel between the nozzle and the bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity for propelling the ink droplet in a substantially straight direction toward a print substrate, such as a piece of paper, transparency, textile, or the like. Some important properties of the ink in this context include desirable viscosity and surface tension, adequate drop velocity, good latency and frequency response, minimum heater deposits (kogation), and no soft threshold voltage problems. Because the droplet of ink is emitted only when the resistor is actuated, thermal ink jet printing is a drop-on-demand system.

In a drop-on-demand ink jet printing apparatus, the printhead typically comprises a linear array of ejectors, and the printhead (with or without partition) is moved relative to the surface of the print substrate, either by moving the print substrate relative to a stationary printhead, or vice versa, or both. In some apparatus, a relatively small printhead moves across a print substrate numerous times in swaths (i.e., multiple passes) to print a desired image. In this instance, the desired image is produced completely on a print substrate in several swaths before the substrate is advanced. This type of printing is called multi-pass (multiple pass) or checkerboard ink jet printing. In checkerboard ink jet printing (or multiple pass), the printhead passes over the print substrate and provides ink at desired locations (for example, printing only even or odd numbered dots in a swath). On one or more subsequent passes, the remaining dots in the image are printed before the print substrate is advanced. Multiple ink jet printheads and ink cartridges can be used to produce multiple color images on a print substrate. Alternatively, a printhead (partial width printhead or partitioned printhead) can be partitioned into several sections (for example, three small sections including cyan, magenta, and yellow inks, or four small sections including cyan, magenta, yellow, and black inks) and equipped with different ink chambers, ink storage media, and inks in a multicolor ink jet printing system. These multicolor systems are commonly employed in desktop ink jet printers, including thermal ink jet printers and piezoelectric ink jet printers. They produce good multicolor images on print substrates such as plain papers and transparencies, but at a slower printing speed. Slightly higher printing speed can be achieved, however, by increasing ink jetting frequency and printhead sweeping rate as well as by using multiple printheads (without partition) and inks.

The ink jet printing apparatus can also employ a printhead comprising two or more printheads butted together to cover a larger width of the print substrate (butted printhead). This type of partial width printhead has more ink nozzles per printhead and can deliver more ink in each swath across the print substrate. In the multi-pass (multiple passes) or checkerboard ink jet printing process a faster ink jet printing process can be carried out. Multicolor ink jet printing processes can use several butted ink jet printheads (e.g. for black, cyan, magenta, and yellow inks) in an ink jet printer to produce multicolored images on substrates at a faster rate than processes using several regular single printheads without butting (unbutted printheads).

Alternatively, a stationary ink jet printhead that consists of an array of ejectors and extends the full width of a print substrate (full width array printhead) can pass ink down the print substrate to give full page images, in what is known as a "full width array" ink jet printer. When the printhead and the print substrate are moved relative to each other, imagewise digital data is used to activate the thermal energy generators or resistors selectively in the printhead over time so that the desired image can be created quickly on the print substrate in a single pass mode. The full width array printhead is generally preferred to be in a stationary position while the print substrate is continuously moving to receive inks as it passes through the printhead or printheads. The full width array printhead or printheads can also, however, be moved across the print substrate if desired. In a multicolor ink jet printing process, several full width array printheads, including cyan, magenta, yellow, and black printheads, as well as other optional printheads and their corresponding inks, can be used to provide different colored images on the print substrate at a high speed. Fast ink jet printing can be achieved by using the full width array printheads.

In a multicolor ink jet printing process, several inks can be printed on a print substrate. In some instances two different inks can be printed next to each other. Intercolor bleed can occur if the inks are not dried properly or if the printing process is too fast for the ink set. Undesired ink mixing on a print substrate, especially on the surface of a plain paper, can cause severely distorted images near the border of two inks. After ink drying, the border of the two inks shows irregular structure with poor edge sharpness (or raggedness) because of the invasion of one ink into the other. The bleed images are not desirable and can be detected easily by eyes. This phenomenon is called intercolor bleed or color bleed. Intercolor bleed is particularly noticeable when a darker ink (such as a black ink) and a lighter ink (such as a yellow ink, a cyan ink, magenta ink, or the like) are printed next to each other, because of high contrast between the two colors. Intercolor bleed can also occur when two color inks are printed next to each other (for example, a yellow ink next to a magenta ink, a yellow ink next to a cyan ink, a magenta ink next to a cyan ink, or the like). The severity of the intercolor bleed generally is affected by ink type and composition, absorption rate of the printed substrate, printhead design, ink drop mass, ink dot size, and method and speed of printing. There is a need to reduce or minimize intercolor bleed and dry time and to produce high quality multicolor ink jet images on print substrates, including plain and coated papers, transparencies, textiles, and other desired substrates.

While known compositions and processes are suitable for their intended purposes, a need remains for improved ink compositions. In addition, a need remains for improved ink compositions suitable for use in ink jet printing processes. Further, a need remains for ink sets for ink jet printing that enable the generation of multicolored images with reduced intercolor bleed. Additionally, a need remains for ink compositions that enable improved print quality. There is also a need for ink compositions with reduced drying time. In addition, there is a need for ink compositions that generate images with reduced smear after water evaporation. Further, there is a need for ink compositions that wet print substrates uniformly to provide uniform ink jet images without mottle. Additionally, there is a need for improved ink compositions that function effectively in a printhead without clogging the nozzles, thereby enabling robust printing operation. A need also remains for ink compositions that are suitable for use in high resolution and high speed multicolor ink jet printers. In addition, a need remains for ink compositions that, when used in ink jet printers, generate images with uniform solid area images.

SUMMARY OF THE INVENTION

The present invention is directed to an ink composition comprising water, a colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks. Another embodiment of the present invention is directed to a set of inks for printing multicolor images in an ink jet printer, said ink set comprising (1) a first ink having a first color and comprising water and a first colorant; and (2) a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks, wherein dry time of the ink containing the block copolymer is decreased and/or intercolor bleed between the first ink and the second ink is reduced when the second ink is printed adjacent to, on top of, or underneath the first ink on a print substrate. Yet another embodiment of the present invention is directed to a multicolor ink jet printing process which comprises: (1) incorporating into an ink jet printer a first ink having a first color and comprising water and a first colorant; (2) incorporating into the ink jet printer a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an alkylsiloxane, a dialkylsiloxane, an alkyl aryl siloxane, a diarylsiloxane, or mixtures thereof, S is an optional spacer group between the A and B blocks, and S' is an optional spacer group between the B and A' blocks; (3) causing droplets of the first ink to be ejected in an imagewise pattern onto a substrate; and (4) causing droplets of the second ink to be ejected in an imagewise pattern onto the substrate, wherein dry time of the ink containing the block copolymer is decreased and/or intercolor bleed between the first ink and the second ink is reduced when the second ink is printed adjacent to, on top of, or underneath the first ink on the substrate.

DETAILED DESCRIPTION OF THE INVENTION

The ink compositions of the present invention comprise an aqueous liquid medium, a colorant, and an ABA' or ASBS'A' block copolymer. The aqueous liquid medium can consist solely of water, or can also include water soluble or water miscible organic components such as humectants, cosolvents, and the like. Many useful known humectants and/or cosolvents are suitable for use in the inks for the present invention. Some suitable humectants and cosolvents include, but are not limited to, glycol derivatives, such as ethylene glycol, diethylene glycol, propylene glycol, dipropylene glycol, polyethylene glycol, polypropylene glycol, poly(ethylene-co-propylene)glycol, and the like, as well as their reaction products with alkylene oxides, including ethylene oxide and propylene oxide; alkyl ethers of glycol derivatives, such as alkyl ethers (alkyl group containing from about 1 to 25 carbon atoms) of ethylene glycol, diethylene glycol, propylene glycol, dipropylene glycol, polyethylene glycol, polypropylene glycol, poly(ethylene-co-propylene)glycol, and the like; triol derivatives containing from about 3 to about 40 carbon atoms, including glycerine, trimethylolpropane, 1,3,5-pentanetriol, 1,2,6-hexanetriol, and the like, as well as their reaction products with alkylene oxides, including ethylene oxide, propylene oxide, and mixtures thereof; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), and the like, as well as their reaction products with alkylene oxides, including ethylene oxide and propylene oxide in any desirable molar ratio to form materials with a wide range of molecular weights; sulfoxide derivatives containing from about 2 to about 40 carbon atoms, including dialkylsulfoxides (symmetric and asymmetric sulfoxides) such as dimethylsulfoxide, methylethylsulfoxide, alkylphenyl sulfoxides, and the like; sulfone derivatives (symmetric and asymmetric sulfones) containing from about 2 to about 40 carbon atoms, including dialkyl sulfones such as dimethysulfone, methylethylsulfone, diethylsulfone, ethylpropylsulfone, dipropylsulfone, propylbutylsulfone, dibutylsulfone, sulfolane (tetramethylenesulfone, a cyclic sulfone), methylsulfolane, dimethylsulfolane, and the like, alkyl phenyl sulfones, such as methylphenylsulfone, ethylphenyl sulfone, and the like; amides with from about 2 to about 40 carbon atoms, such as N-alkylamides, N,N-dialkyl amides, N,N-alkyl phenyl amides, 2-pyrrolidinone (a cyclic amide), N-methylpyrrolidinone (a cyclic amide), N-cyclohexylpyrrolidinone, N,N-dimethyl-p-toluamide (aromatic), N,N-dimethyl-o-toluamide, N,N-diethyl-m-toluamide, and the like; ethers, such as alkyl ether derivatives of various alcohols, ether derivatives of triols and diols, including butylcarbitol, hexylcarbitol, triolethers, alkyl ethers of polyethyleneglycols, alkyl ethers of polypropyleneglycols, phenyl ethers of polyethyleneglycols, phenyl ethers of polypropyleneglycols, alkyl ethers of phenylpolyethyleneglycols, alkyl ethers of phenylpolypropyleneglycols, and the like; urea and urea derivatives; inner salts such as betaine, and the like; thio (sulfur) derivatives (or isomers) of the aforementioned materials (humectants), including thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxypropanolamine, and the like; reaction products of aforementioned materials (humectants) with alkylene oxides; and mixtures thereof.

Further examples of suitable humectants are disclosed in, for example, U.S. Pat. Nos. 5,281,261, 5,531,818, 5,693,129, 4,840,674, 5,356,464, copending application U.S. Ser. No. 08/782,237, and copending application U.S. Ser. No. 08/876,41, the disclosures of each of which are totally incorporated herein by reference. For example, U.S. Pat. No. 5,693,129 discloses the use of hydroxyamide derivatives, mercaptoamide derivatives, hydroxythioamide derivatives, mercaptothioamide derivatives, and oxyalkylene (alkyleneoxide) reaction products of the above said derivatives as anticurl agents for ink jet ink compositions. These materials and other known anti-curl agents, including those disclosed in, for example, U.S. Pat. No. 5,356,464 can be employed in the inks for the present invention to provide both anticurl and antibleed properties for the production of multicolor images. Furthermore, ink compositions for the present invention further comprising some of the materials disclosed in U.S. Pat. No. 5,693,129 and copending application U.S. Ser. No. 08/782,237 can be used in a high resolution ink jet printing process to provide long ink latency and high frequency response. The inks for the present invention, in some embodiments, will have a reduced tendency to clog the printhead nozzles or resist smooth ink flow, and will exhibit less frequency of ink spitting and printhead wiping for maintenance. Furthermore, the ink compositions for the present invention can be used with regular printheads, partitioned printheads, partial width printheads, and full width array printheads in ink jet printing processes. The ability of the ink compositions for the present invention to be jetted at high frequency (because of high frequency response, typically 3 KiloHertz or greater) allows one to print multicolor ink jet images at high speed, especially when full width array ink jet printheads are used. A printing speed of 50 copies per minutes for the production of multicolor images can be achieved using a set of full width array printheads (e.g. black, cyan, magenta, and yellow). The print substrates can optionally be heated at any stage of the printing process, including before, during, and after the printing process as well as combinations thereof.

Humectants, if present, are in the ink in any desired or effective amount, typically up to about 45 percent by weight of the ink, preferably up to about 40 percent by weight of the ink, and more preferably from about 5 to about 35 percent by weight of the ink, although the amount can be outside of these ranges.

Ink compositions of the present invention can also be prepared with low viscosity. Low molecular weight materials are preferred in the inks. Some examples of additional useful ink ingredients are disclosed in, for example, U.S. Pat. Nos. 5,281,261, 5,531,818, and 5,693,129, the disclosures of each of which are totally incorporated herein by reference. Ink compositions for the present invention with low viscosity can allow fast ink jetting and refill in multicolor ink jet printing processes with inks of the present invention. The viscosity of the ink composition is usually less than about 20 centipoise (at room temperature, i.e., about 25° C.), preferably from about 1 to about 10 centipoise, and more preferably from about 1 to about 5 centipoise.

The ink compositions of the present invention further contain a colorant. The colorant can be a pigment, a dye, or a mixture thereof. A pigment colorant is one that is substantially insoluble in the ink aqueous medium. The pigment can be selected from the suitable colorants listed in the *Color Index*, published jointly by American Association of Textile Chemist and Colorists (AATCC) and The Society of Dyers and Colorists in Bradford, England; *BUYER'S GUIDE for Textile Chemist and Colorist*, published by AATCC, and the like. The pigment can be present in the inks either with or without a dispersing agent. For example, pigment particles such as those modified chemically to possess water ionizable functional groups (either negatively or positively charged), such as carboxylate, sulfonate, phosphonate, phosphate, or ammonium groups, are stable in an aqueous ink and do not necessarily require a dispersing agent. Unlike many commercially available unmodified pigments, which rely primarily on external polymeric dispersants for needed stability in aqueous inks, the chemically modified pigments have the functional groups attached directly to the pigment particle surfaces via covalent bonds. The water ionizable functional groups can stabilize the pigment particles in the aqueous ink medium and provide needed stability without undesired pigment precipitation or coagulation. If needed, however, a pigment dispersant can also be used in conjunction with the chemically modified pigment (or surface modified pigment) to improve the stability of the ink. Some examples of chemically modified pigments are disclosed in, for example, U.S. Pat. No. 5,281,261, the disclosure of which is totally incorporated herein by reference; also suitable are commercial carbon black dispersions such as Cabojet® 200, Cabojet® 300 (surface modified pigment), colored pigment dispersions, available from Cabot Chemical Co., the Bonjet® carbon black dispersions from Orient Chemical Company of Japan, other commercially available surface modified pigments (e.g. carbon black and color pigments), and the like. Pigment particles which are not chemically modified preferably are present with at least a dispersing agent (or dispersant) to stabilize the particles in an aqueous ink. The pigment stabilizing or dispersing agent can be anionic, cationic, or nonionic.

Pigments can be of any desired color, such as black, cyan, magenta, yellow, red, blue, green, brown, or the like, as well as mixtures thereof. It is preferred that the pigment particles in an ink jet ink composition have the same or similar color so there is no interference or impairment of the desired color of the final ink. Examples of suitable pigments in the ink jet ink compositions include, but are not limited to, various carbon blacks such as channel blacks; furnace blacks; lamp blacks; Raven® carbon blacks including Raven® 5250, Raven® 5750, Raven® 3500 and other similar carbon black products available from Columbia Company; carbon blacks including Regal® 330, Black Pearl® L, Black Pearl® 1300, and other similar carbon black products available from Cabot Corporation; Degussa carbon blacks such as Color Black® series, Special Black® series, Printtex® series and Derussol® carbon black dispersions available from Degussa Company; Cabojet® series carbon black dispersions including Cabojet® 200, Cabojet® 300, Cabojet® IJX 157, Cabojet® IJX 164, and the like from Cabot corporation; Lavanyl® carbon black dispersions from Bayer Company, Special Black® carbon black dispersions from BASF Co.; Hostafine® series pigment dispersions such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7, carbon black), and Hostafine® Black TS (Pigment Black 7), available from Hoechst/Celanese Corporation; Normandy Magenta RD-2400 (Paul Uhlich); Paliogen Violet 5100 (BASF); Paliogen® Violet 5890 (BASF) Permanent Violet VT2645 (Paul Uhlich); Heliogen Green L8730 (BASF); Argyle Green XP-111-S (Paul Uhlich); Brilliant Green Toner GR 0991 (Paul Uhlich); Heliogen® Blue L6900; L7020 (BASF), Heliogen® Blue D6840, D7080 (BASF); Sudan Blue OS (BASF); PV Fast Blue B2G01 (Hoechst/Celanese); Irgalite Blue BCA (Ciba-Geigy); Paliogen® Blue 6470 (BASF); Sudan III (Matheson, Coleman, Bell); Sudan II (Matheson, Coleman, Bell); Sudan IV (Matheson, Coleman, Bell); Sudan Orange G (Aldrich); Sudan Orange 220 (BASF); Paliogen® Orange 3040 (BASF); Ortho Orange OR 2673 (Paul Uhlich); Paliogen® Yellow 152, 1560 (BASF); Lithol Fast Yellow 0991K (BASF); Paliotol Yellow 1840 (BASF); Novoperm® Yellow FG 1 (Hoechst/Celanese); Permanent Yellow YE 0305 (Paul Uhlich); Lumogen Yellow D0790 (BASF); Suco-Gelb L1250 (BASF); Suco-Yellow D1355 (BASF); Hostaperm® Pink E (Hoechst/Celanese), Fanal Pink D4830 (BASF); Cinquasia Magenta (DuPont); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Pigment Red 122 from Toyo Ink of Japan; Paliogen® Red 3871K (BASF); Paliogen® Red 3340 (BASF); Lithol Fast Scarlet L4300 (BASF); and mixtures thereof. Many useful pigments can also be found in the *Color Index,* published jointly by American Association of Textile Chemist and Colorists (AATCC) and The Society of Dyers and Colorists in Bradford, England.

Pigment colorants can be present in the ink in any effective amount. Typically the pigment is present in an amount of from about 0.1 to about 15 percent by weight of the ink, and preferably from about 1 to about 10 percent by weight of the ink, although the amount can be outside of these ranges.

Preferably, the pigment particle size is as small as possible to enable a stable colloidal suspension of the particles in the liquid medium with good color strength, and to prevent clogging of the ink channels or nozzle openings when the ink is used in an ink jet printer. Preferred average particle sizes or diameters are generally from about 0.001 to about 3 microns, although the particle sizes can be outside of these ranges. A more preferred pigment particle size distribution is one wherein particles having at least 50 percent of the particles being below 0.3 micron, with no particles being greater than 3.0 microns (measured on, for example, a Hodaka CAPA 700 Particle Size Analyzer, a Malvern particle size analyzer, a Model BI-90 Brookhaven Instruments particle size analyzer, or the like). More preferably, the average pigment particle size includes particles having at least 70 percent of the particles being below 0.3 micron, with no particles being greater than 1.2 microns. Pigment particle sizes can, however, be outside of these ranges provided that they do not cause undesired clogging and maintenance problems.

In some embodiments of the present invention, the pigment can be dispersed in the ink with one or more dispersants (dispersing agents) or stabilizing agents. The stabilizing agents can be anionic, cationic, or nonionic. Some pigment stabilizing agents have both hydrophilic (comprising ionic groups which are capable of ionizing in water or water compatible groups) and hydrophobic (affinity for pigments) moieties. Suitable stabilizing agents include, but are not limited to, anionic dispersants, such as polymers and random copolymers of styrene sulfonate salts (such as $Na^+$, $Li^+$, $K^+$, $Cs^+$, $Rb^+$, substituted and unsubstituted ammonium cations, and the like), unsubstituted and substituted (such as alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) with an aldehyde derivative, such as unsubstituted alkyl aldehyde derivatives, including formaldehyde, acetaldehyde, propylaldehyde, and the like, as well as mixtures thereof. Examples of such stabilizing agents include, but are not limited to, commercial products such as Versa® 4, Versa® 7, Versa® 77 (National Starch and Chemical Co.); Lomar® D (Diamond Shamrock Chemical Co.); Daxad® 19, Daxad® K (W.R. Grace & Co.); Tamol® SN (Rohm & Haas); and the like. Other useful anionic stabilizing agents include polymers or random copolymers of styrene and an acrylic acid salt, styrene and a methacrylic acid salt, styrene and a maleic acid salt, block copolymers comprising acrylates or methacrylates, and the like, as well as mixtures thereof.

Nonionic pigment stabilizing agents (or dispersing agents or dispersants) or surfactants can also be used in inks for the present invention, such as ethoxylated monoalkyl or dialkyl phenols, including Igepal® CA and CO series materials (Rhone-Poulenc Co., such as Igepal® CA-630, CO-630, and the like); Surfynol® series materials from Air Products and Chemicals Co.; and Triton® series materials (Union Carbide Company). These nonionic surfactants or dispersants can be used alone or in combination with anionic or cationic dispersants.

The ratio of pigment to stabilizing agent by weight typically is from about 1:0.01 to about 1:4, preferably from about 1:0.1 to about 1:2, and more preferably from about 1:0.10 to about 1:1.5, although the ratio can be outside of these ranges.

The ratio of naphthalene substituent to aldehyde in the aforementioned anionic stabilizing agents typically is about 1:1, although this ratio can be different depending on the stoichiometry of the feed stock and reaction condition, and can readily be adjusted to obtain a dispersant having a desired molecular weight and the desired ratio of naphthalene substituent to aldehyde. The weight average molecular weight of the pigment stabilizing agent is generally less than about 50,000, preferably less than about 25,000, and more preferably less than about 10,000, although the weight average molecular weight can be outside of these ranges. The pigment dispersion preferably contains enough dispersant to stabilize the pigment particles in water, but not so much as to affect adversely properties of the dispersion and ink such as viscosity, stability, and optical density.

Dye colorants are those colorants that are soluble in the aqueous liquid vehicle. The dye can be selected from the suitable colorants listed in the *Color Index,* published jointly by American Association of Textile Chemist and Colorists (AATCC) and The Society of Dyers and Colorists in Bradford, England; BUYER'S GUIDE for Textile Chemist and Colorist, published by AATCC, and the like. Any suitable dye or mixture of dyes that is compatible with the other ink ingredients can be used. Water soluble or water dispersible anionic dyes, direct dyes, reactive dyes, and cationic dyes can be selected. Examples of suitable dyes include, but are not limited to, Food dyes such as Food Black No. 1, Food Black No. 2, Food Red No. 40, Food Blue No. 1, Food Yellow No. 7, and the like; FD & C dyes; Acid Black dyes (No. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like); Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 236, 337, and the like); Direct Yellow dyes (No. 4, 11, 12, 27, 28, 33, 34, 39, 50, 58, 86, 100, 106, 107, 118, 127, 132, 142, 157, and the like); anthraquinone dyes; monoazo dyes; disazo dyes; phthalocyanine derivatives, including various phthalocyanine sulfonate salts; aza (18) annulenes; Formazan copper complexes; triphenodioxazines; Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical Co.; Reactive Dyes (e.g. Reactive Black 5, Reactive Blue 2, Reactive Blue 4, Reactive Blue 15, Reactive Orange 16, Reactive Red 2, Reactive Red 4, Reactive Yellow 2, and Reactive Yellow 81) from Aldrich Chemical Co.; Reactive Red 180 and its hydrolyzed form from Mitsubishi Chemical Co. of Japan; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI of America (Zeneca Co.); Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X34, available from BASF; Carta Black 2GT, available from Sandoz, Inc.; Neozapon Red 492, available from BASF; Orasol Red G available from Ciba-Geigy; Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor Acid Yellow 34; Telon Fast Yellow 4GL-175; BASF Basacid Black SE 0228; the Pro-Jet® series of dyes available from Zeneca Co., including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), and Pro-Jet® waterfast dyes; Aminyl Brilliant Red F-B, available from Sumitomo Chemical Company (Japan); the Duasyn® line of "salt-free" dyes available from Hoechst/Celanese, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), and Duasyn® Acid Blue AE-SF VP344 (Acid Blue 9); Dispersed Dyes; various Reactive dyes, including Reactive Black dyes, Reactive Blue dyes, Reactive Red dyes, and Reactive Yellow dyes; and the like; as well as mixtures thereof.

A dye colorant is present in the ink in any effective amount to provide desired color and optical density. Typically, the dye is present in an amount from about 0.01 to about 15 percent by weight of the ink, preferably from about 0.1 to about 10 percent by weight of the ink, more preferably from about 1 to about 8 percent by weight of the ink, and even more preferably from about 1 to about 5 percent by weight of the ink, although the amount can be outside of these ranges. A mixture of dyes in any desired proportion can also be employed to obtain a specific shade or hue.

The ink compositions of the present invention also contain an ABA' block copolymer wherein the A and A' blocks each contain one or more repeat monomer units of ethylene oxide, propylene oxide, or random or alternating mixtures of ethylene oxide and propylene oxide, and wherein the B block contains one or more repeat monomer units of a dialkylsiloxane, alkyl aryl siloxane, or diarylsiloxane. Optionally, the A and B blocks can be separated by a spacer group S. Optionally, the B and A' blocks can be separated by a spacer group S'. Accordingly, the block copolymers of the present invention can also be represented as ASBS'A' block copolymers, wherein S and S' are optional spacer groups.

The ASBS'A' block copolymers suitable for the inks of the present invention have a linear structure (linear polymer backbone), and are to be distinguished from grafted or branched dimethylsiloxane copolymers.

A and A' are each, independently of the other, blocks comprising one or more repeat monomer units of ethylene oxide, propylene oxide, or random or alternating mixtures of ethylene oxide and propylene oxide in any combination or length. The A and A' blocks can be either the same as each other or different from each other in terms of both composition (all ethylene oxide, all propylene oxide, mixtures of alternating or random ethylene oxide and propylene oxide units in different ratios, or the like) and chain length. A and A' preferably are each selected so that A and A' each, independently of the other, have from 1 to about 15,000 repeat ethylene oxide and/or propylene oxide units in the ABA' block copolymer, although the number of repeat alkylene oxide units can be outside of this range.

B is a block comprising one or more repeat monomer units of an alkylsiloxane, a dialkylsiloxane, an alkyl aryl siloxane, a diarylsiloxane, or mixtures thereof. The alkyl or aryl groups on the alkylsiloxane, dialkylsiloxane, alkyl aryl siloxane, and/or diarylsiloxane repeat monomer units typically have from 1 to about 10 carbon atoms, although the number of carbon atoms can be outside of this range. Particularly preferred repeat monomers for the B block include dimethyl siloxane, methyl ethyl siloxane, diethyl siloxane, methylphenyl siloxane, diphenyl siloxane, and the like. B preferably is selected so that the number of repeat alkylsiloxane, dialkylsiloxane, alkyl aryl siloxane, and/or diarylsiloxane units in the ABA' or ASBS'A' block copolymer is from 1 to about 15,000, although the number of repeat siloxane units can be outside of this range.

S is an optional spacer group between the A and B blocks and S' is an optional spacer group between the B and A' blocks. When S is absent, the A block is directly bonded to the B block. When S' is absent, the B block is directly bonded to the A' block. When both the S and the S' optional spacer groups are simultaneously absent, then the block copolymer of ASBS'A' becomes the ABA' block copolymer. S and S' each, independently of the other, can be (but are not limited to) alkylene groups, alkylene oxide groups, alkylsilyl groups, dialkylsilyl groups, alkylarylsilyl groups, diarylsilyl groups, propylenylalkylsilyl groups, propylenyldialkylsilyl groups, propylenylalkylarylsilyl groups, propylenyldiarylsilyl groups, alkylsiloxy groups, dialkylsiloxy groups, alkylarylsiloxy groups, diarylsiloxy groups, propyleneoxyalkylsilyl groups, propylenylalkylsiloxy groups, propyleneoxydialkylsilyl groups, propylenyldialkylsiloxy groups, propyleneoxyalkylarylsilyl groups, propylenylalkylarylsiloxy groups, propyleneoxydiarylsilyl groups, propylenyldiarylsiloxy groups, heteroatoms, or mixtures thereof. Examples of suitable alkylene S and S' groups include those with from 1 to about 10 carbon atoms, including linear, branched, and cyclic alkylene groups, such as methylene (—CH$_2$—), ethylene (—CH$_2$CH$_2$—), n-propylene (—CH$_2$CH$_2$CH$_2$—), isopropylene (—CH$_2$CH(CH$_3$)CH$_2$—), cyclopropylene (—C$_3$H$_5$—), cyclobutylene (—C$_4$H$_7$—), cyclopentylene (—C$_5$H$_9$—), cyclohexylene (—C$_6$H$_{11}$—), and the like. Examples of suitable alkylene oxide S and S' groups include those with from 1 to about 10 carbon atoms, including linear, branched, and cyclic alkylene oxide groups, such as methylene oxide (—CH$_2$O— or —OCH$_2$—), ethylene oxide (—CH$_2$CH$_2$O— or —OCH$_2$CH$_2$—), n-propylene oxide (—CH$_2$CH$_2$CH$_2$O— or —OCH$_2$CH$_2$CH$_2$—), isopropylene oxide (—CH$_2$CH(CH$_3$)CH$_2$O— or —OCH$_2$CH(CH$_3$)CH$_2$—), cyclopropylene oxide (—C$_3$H$_5$O— or —OC$_3$H$_5$—), cyclobutylene oxide (—C$_4$H$_7$O— or —OC$_4$H$_7$—), cyclopentylene oxide (—C$_5$H$_9$O— or —OC$_5$H$_9$—), cyclohexylene oxide (—C$_6$H$_{11}$O— or —OC$_6$H$_{11}$—), and the like. Examples of suitable alkysilyl S and S' groups, dialkysilyl S and S' groups, alkylarylsilyl S and S' groups, diarylsilyl S and S' groups, propylenylalkylsilyl, propylenyldialkylsilyl, propylenyldiarylsilyl, and propylenylalkylarylsilyl S and S' groups include those wherein the alkyl moieties have from 1 to about 10 carbon atoms and the aryl moieties have from 6 to about 20 carbon atoms, such as dimethylsilyl (—Si(CH$_3$)$_2$—), methylethylsilyl (—Si(CH$_3$)(C$_2$H$_5$)—), methylphenylsilyl (—Si(CH$_3$)(C$_6$H$_5$)—), diphenylsilyl (—Si(C$_6$H$_5$)$_2$—), propylenyldimethylsilyl (—C$_3$H$_6$—Si(CH$_3$)$_2$— or —Si(CH$_3$)$_2$—C$_3$H$_6$—), and the like. Examples of suitable alkylsiloxy S and S' groups, dialkylsiloxy S and S' groups, alkylarylsiloxy S and S' groups, diarylsiloxy S and S' groups, propyleneoxyalkylsilyl S and S' groups, propylenylalkylsiloxy S and S' groups, propyleneoxydialkylsilyl S and S' groups, propylenyldialkylsiloxy S and S' groups, propylenylalkylarylsiloxy S and S' groups, propyleneoxyalkylarylsilyl S and S' groups, propylenyldiarylsiloxy S and S' groups, and propyleneoxydiarylsilyl S and S' groups include those wherein the alkyl moieties have from 1 to about 10 carbon atoms and the aryl moieties have from 6 to about 20 carbon atoms, such as dimethylsiloxy (—Si(CH$_3$)$_2$O—), methylethylsiloxy (—Si(CH$_3$)(C$_2$H$_5$)O—), methylphenyl siloxy (—Si(CH$_3$)(C$_6$H$_5$)O—), diphenylsiloxy (—Si(C$_6$H$_5$)$_2$O—), propylenyldimethylsiloxy (—C$_3$H$_6$—Si(CH$_3$)$_2$O— or —Si(CH$_3$)$_2$—C$_3$H$_6$O— or —OC$_3$H$_6$—Si(CH$_3$)$_2$— or —OSi(CH$_3$)$_2$—C$_3$H$_6$—), and the like. Examples of suitable S and S' heteroatoms include oxygen, nitrogen, phosphorus, sulfur, silicon, and the like, as well as mixtures thereof. Two or more of the aforementioned suitable S and S' groups can also be combined to provide a spacer group; for example, a single spacer group S or S' can comprise both an alkylene group and a dialkyl silyl group, such as —(CH$_2$)$_a$—Si(CH$_3$)$_2$— or —Si(CH$_3$)$_2$—(CH$_2$)$_b$— wherein a and b each, independently of the other, is an integer of from 0 to about 10.

The terminal groups on the block copolymer are bonded to the A and A' blocks and typically are hydrogen atoms, hydroxyl groups, alkyl groups (including linear, branched, and cyclic alkyl groups), hydroxyl-substituted alkyl groups (including hydroxyl-substituted linear, branched, and cyclic alkyl groups), alkoxy groups (including alkoxy groups with linear, branched, and cyclic alkyl moieties), aryl groups, hydroxyl-substituted aryl groups, aryloxy groups, or heterocyclic groups (wherein the heteroatom can be, but is not limited to, oxygen, nitrogen, phosphorus, silicon, sulfur, or the like), wherein the alkyl, hydroxyl-substituted alkyl, alkoxy, aryl, hydroxyl-substituted aryl, aryloxy, and heterocyclic groups typically have from 1 to about 30 carbon atoms, although the number of carbon atoms can be outside of this range, and although other terminal groups can be selected. Preferably the terminal group is selected to avoid a peroxy linkage; accordingly, if the atom of the A or A' block immediately connected to the terminal group is an oxygen atom, terminal groups such as hydroxyl groups or alkoxy groups preferably are not selected to avoid peroxy linkages.

Suitable ABA' or ASBS'A' block copolymers for the inks of the present invention (also showing the optional spacer groups) include, but are not limited to, those of the general formula

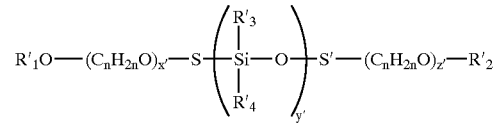

wherein n is 2 or 3 and, within the polymer, n has an average value of from about 2 to about 3, R'$_1$ and R'$_2$ each, independently of the other, are hydrogen atoms, alkyl groups (including linear, branched, and cyclic alkyl groups), typically with from 1 to about 30 carbon atoms, although the number of carbon atoms can be outside of this range, hydroxyalkyl groups (including linear, branched, and cyclic hydroxyalkyl groups), typically with from 1 to about 30 carbon atoms, although the number of carbon atoms can be outside of this range, aryl groups, typically with from 6 to about 30 carbon atoms, although the number of carbon atoms can be outside of this range, hydroxyaryl groups, typically with from 6 to about 30 carbon atoms, although the number of carbon atoms can be outside of this ranges, or heterocyclic groups, wherein the hetero atom can be (but is not limited to) nitrogen, oxygen, sulfur, silicon, phosphorus, or the like, typically with from 4 to about 30 carbon atoms, although the number of carbon atoms can be outside of this range, R'$_3$ and R'$_4$ each, independently of the other, is a hydrogen atom, an alkyl group, typically with from 1 to about 10 carbon atoms, although the number of carbon atoms can be outside of this range, or an aryl group, typically with from 6 to about 20 carbon atoms, although the number of carbon atoms can be outside of this range, x', y', and z' are each integers representing the numbers of repeat monomer units, wherein x' and z' each, independently of the other, are typically from 1 to about 15,000, although the values of x' and z' can be outside of this range, and y' is an integer typically of from 1 to about 15,000, and preferably from 1 to about 10,000, although the value of y' can be outside of these ranges, and wherein the S and S'optional spacer groups each, independently of the other, can be alkylene groups, alkylene oxide groups, dialkylsilyl groups, alkylarylsilyl groups, diarylsilyl groups, propylenydialkylsilyl groups, dialkylsiloxy groups, alkylarylsiloxy groups, diarylsiloxy groups, propylenyldimethylsiloxy groups, propyleneoxy-dimethylsilyl groups, propylenyldialkylsiloxy groups, propyleneoxydialkylsilyl groups, propyleneoxydiarylsilyl groups, propyleneoxyalkylarylsilyl groups, propylenylalky-larylsiloxy groups heteroatoms, or mixtures thereof.

When n is 3, the repeat propylene oxide units can be n-propylene oxide groups, of the formula

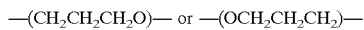

or isopropylene oxide groups, of the formula

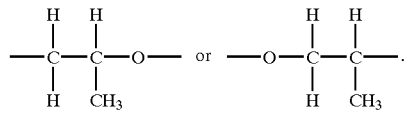

The A and A' blocks in the block copolymers for the inks of the present invention can contain all ethylene oxide repeat units, all propylene oxide repeat units, or random or alternating mixtures of ethylene oxide and propylene oxide repeat units.

For illustration purposes, further examples of suitable ASBS'A' block copolymers for the inks of the present invention will now be presented. Type 1 block copolymers (those of Formula I and Formula II) have a B block with one or more dialkylsiloxane repeat monomer units, wherein the alkyl groups of the dialkylsiloxane each, independently of the other, have from 1 to about 10 carbon atoms. Type 1 materials include, but are not limited to, the following:

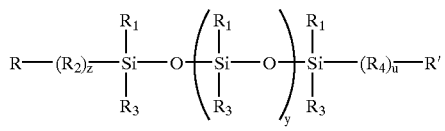
I wherein R and R' each, independently of the other, can be hydrogen atoms, hydroxyl groups, alkyl groups (including linear, branched, and cyclic alkyl groups), hydroxyl-substituted alkyl groups (including hydroxyl-substituted linear, branched, and cyclic alkyl groups), alkoxy groups (including alkoxy groups with linear, branched, and cyclic alkyl moieties), aryl groups, hydroxyl-substituted aryl groups, aryloxy groups, or heterocyclic groups (wherein the heteroatom can be, but is not limited to, oxygen, nitrogen, phosphorus, silicon, sulfur, or the like), wherein the alkyl, hydroxyl-substituted alkyl, alkoxy, aryl, hydroxyl-substituted aryl, aryloxy, and heterocyclic groups typically have from 1 to about 30 carbon atoms, although the number of carbon atoms can be outside of this range, $R_1$ and $R_3$ each, independently of the other, are hydrogen atoms or alkyl groups (including linear, branched, and cyclic alkyl groups) typically with from 1 to about 10 carbon atoms, although the number of carbon atoms can be outside of this range, $R_2$ and $R_4$ each, independently of the other, are $(OC_nH_{2n})$ or $(C_nH_{2n}O)$, wherein within each of $R_2$ and $R_4$ n has an average value of from 2 to 3, u and z each, independently of the other, are integers of from 1 to about 15,000, and y is an integer of from 1 to about 15,000. In the block copolymers of Formula I, one spacer group is a dialkylsiloxy group and one spacer group is a dialkylsilyl group. The following types of linkages between the dialkylsilyl or dialkylsiloxy groups and the alkylene oxide groups are possible:

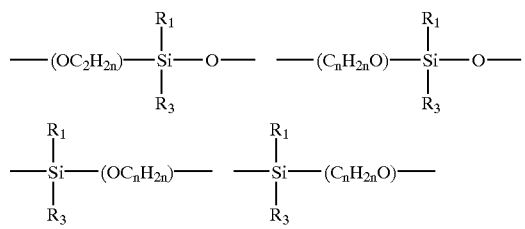

wherein n is 2 or 3. For example, when $R_1$ and $R_3$ are selected as methyl groups, the block copolymer is of Formula IA:

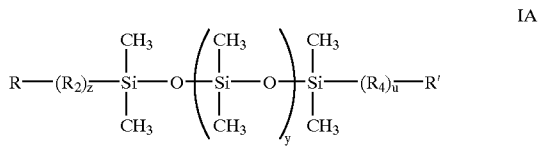
IA wherein R, R', $R_2$, $R_4$, z, y, and u are as defined hereinabove for polymers of Formula I.

When, for block copolymers of Formula IA, $R_2$ and $R_4$ are each selected to be —$C_3H_6O$—, the block copolymer is of the formula IA1:

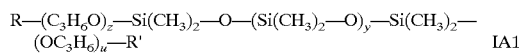
IA1

When R and R' are each selected to be hydroxyl groups, the block copolymer is of the formula IA1.1:

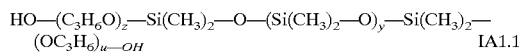
IA1.1

When R and R' are each selected to be methoxy groups, the block copolymer is of the formula IA1.2:

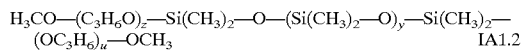
IA1.2

When R is selected to be a hydroxyl group and R' is selected to be a methoxy group, the block copolymer is of the formula IA1.3:

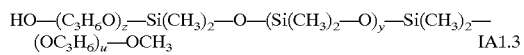
IA1.3

When, for block copolymers of Formula IA, $R_2$ and $R_4$ are each selected to be —$C_2H_4O$—, the block copolymer is of the formula IA2:

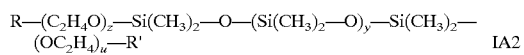
IA2

When R and R' are each selected to be hydroxyl groups, the block copolymer is of the formula IA2.1:

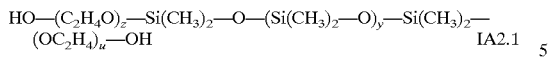
IA2.1

When R and R' are each selected to be methoxy groups, the block copolymer is of the formula IA2.2:

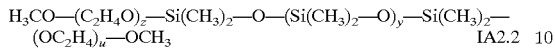
IA2.2

When R is selected to be a hydroxyl group and R' is selected to be a methoxy group, the block copolymer is of the formula IA2.3:

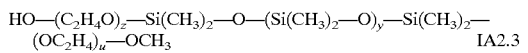
IA2.3

When, for block copolymers of Formula IA, $R_2$ and $R_4$ are each selected to be —$OC_3H_6$—, the block copolymer is of the formula IA3:

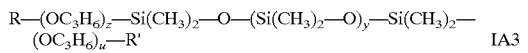
IA3

When R is selected to be a hydrogen atom and R' is selected to be a hydroxyl group, the block copolymer is of the formula IA3.1:

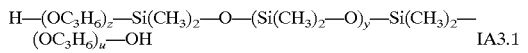
IA3.1

When R is selected to be a methyl group and R' is selected to be a methoxy group, the block copolymer is of the formula IA3.2:

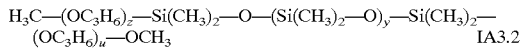
IA3.2

When R is selected to be a methyl group and R' is selected to be a hydroxyl group, the block copolymer is of the formula IA3.3:

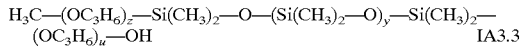
IA3.3

When, for block copolymers of Formula IA, $R_2$ and $R_4$ are each selected to be —$OC_2H_4$—, the block copolymer is of the formula IA4:

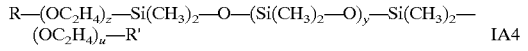
IA4

When R is selected to be a hydrogen atom and R' is selected to be a hydroxyl group, the block copolymer is of the formula IA4.1:

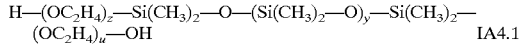
IA4.1

When R is selected to be a methyl group and R' is selected to be a methoxy group, the block copolymer is of the formula IA4.2:

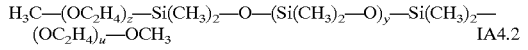
IA4.2

When R is selected to be a hydrogen atom and R' is selected to be a methoxy group, the block copolymer is of the formula IA4.3:

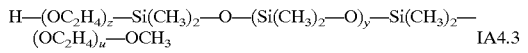
IA4.3

When, for block copolymers of Formula IA, $R_2$ is selected to be —$OC_3H_6$— and $R_4$ is selected to be —$C_3H_6O$—, the block copolymer is of the formula IA5:

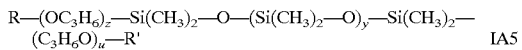
IA5

When R and R' are each selected to be hydrogen atoms, the block copolymer is of the formula IA5.1:

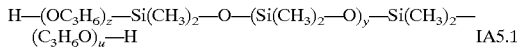
IA5.1

When R and R' are each selected to be methyl groups, the block copolymer is of the formula IA5.2:

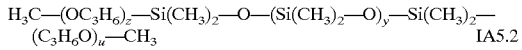
IA5.2

When R is selected to be a hydrogen atom and R' is selected to be a methyl group, the block copolymer is of the formula IA5.3:

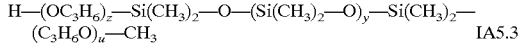
IA5.3

When, for block copolymers of Formula IA, $R_2$ is selected to be —$OC_2H_4$— and $R_4$ is selected to be —$C_2H_4O$—, the block copolymer is of the formula IA6:

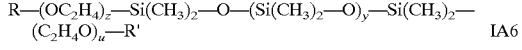
IA6

When R and R' are each selected to be hydrogen atoms, the block copolymer is of the formula IA6.1:

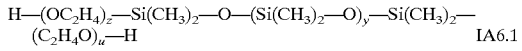
IA6.1

When R and R' are each selected to be methyl groups, the block copolymer is of the formula IA6.2:

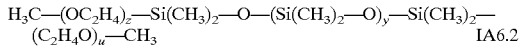
IA6.2

When R is selected to be a hydrogen atom and R' is selected to be a methyl group, the block copolymer is of the formula IA6.3:

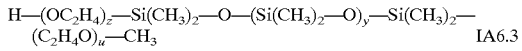
IA6.3

In all of the above formulae, u, y, and z each, independently of the others, is an integer of from 1 to about 15,000.

Type 1 materials also include, but are not limited to, the following:

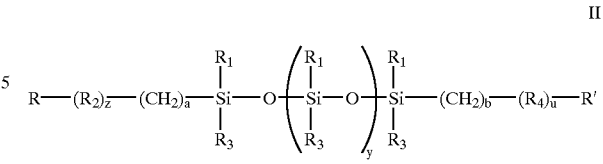
II wherein R and R' each, independently of the other, can be hydrogen atoms, hydroxyl groups, alkyl groups (including linear, branched, and cyclic alkyl groups), hydroxyl-substituted alkyl groups (including hydroxyl-substituted linear, branched, and cyclic alkyl groups), alkoxy groups (including alkoxy groups with linear, branched, and cyclic alkyl moieties), aryl groups, hydroxyl-substituted aryl groups, aryloxy groups, or heterocyclic groups (wherein the heteroatom can be, but is not limited to, oxygen, nitrogen, phosphorus, silicon, sulfur, or the like), wherein the alkyl, hydroxyl-substituted alkyl, alkoxy, aryl, hydroxyl-substituted aryl, aryloxy, and heterocyclic groups typically have from 1 to about 30 carbon atoms, although the number of carbon atoms can be outside of this range, $R_1$ and $R_3$ each, independently of the other, are hydrogen atoms or alkyl groups (including linear, branched, and cyclic alkyl groups) typically with from 1 to about 10 carbon atoms, although the number of carbon atoms can be outside of this range, $R_2$ and $R_4$ each, independently of the other, are $(OC_nH_{2n})$ or $(C_nH_{2n}O)$, wherein within each of $R_2$ and $R_4$ n has an average value of from 2 to 3, u and z each, independently of the other, are integers of from 1 to about 15,000, y is an integer of from 1 to about 15,000, and a and b each, independently of the other, are integers of from 0 to about 10, wherein the sum of $a+b \geqq 2$. In the block copolymers of Formula II, one spacer group is a combination of an alkylene group and a dialkylsiloxy group and one spacer group is a combination of an alkylene group and a dialkylsilyl group. The following types of linkages between the spacer groups and the alkylene oxide groups are possible:

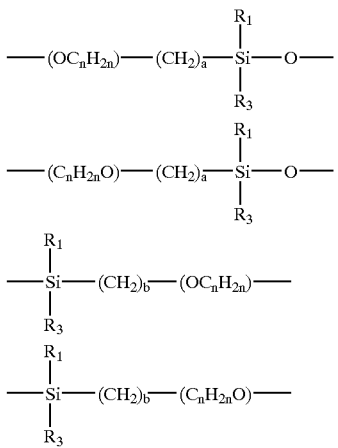

For example, when $R_1$ and $R_3$ are selected as methyl groups, the block copolymer is of Formula IIA:

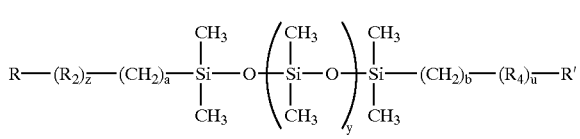
IIA wherein R, R', $R_2$, $R_4$, z, y, u, a, and b are as defined hereinabove for block copolymers of Formula II.

When, for block copolymers of Formula IIA, $R_2$ is selected to be —$C_3H_6O$— and $R_4$ is selected to be —$OC_3H_6$—, the block copolymer is of the formula IIA1:

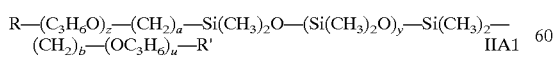
IIA1

When R and R' are each selected to be hydroxyl groups, the block copolymer is of the formula IIA1.1:

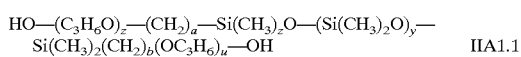
IIA1.1

When R and R' are each selected to be methoxy groups, the block copolymer is of the formula IIA1.2:

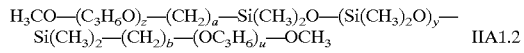
IIA1.2

When R is selected to be a hydroxyl group and R' is selected to be a methoxy group, the block copolymer is of the formula IIA1.3:

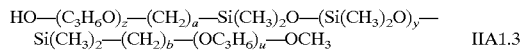
IIA1.3

When, for block copolymers of Formula IIA, $R_2$ is selected to be —$C_2H_4O$— and $R_4$ is selected to be —$OC_2H_4$—, the block copolymer is of the formula IIA2:

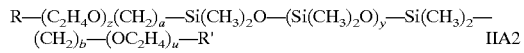
IIA2

When R and R' are each selected to be hydroxyl groups, the block copolymer is of the formula IIA2.1:

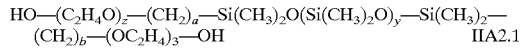
IIA2.1

When R and R' are each selected to be methoxy groups, the block copolymer is of the formula IIA2.2:

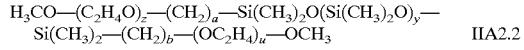
IIA2.2

When R is selected to be a hydroxyl group and R' is selected to be a methoxy group, the block copolymer is of the formula IIA2.3:

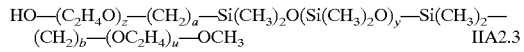
IIA2.3

An example of a material of Formula IIA2 having a spacer group S which is —$(CH_2)_3$—$Si(CH_3)_2$—O— and a spacer group S' which is —$Si(CH_3)_2$—$(CH_2)_3$— is the following:

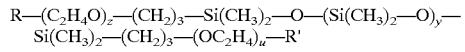

When, for block copolymers of Formula IIA, $R_2$ and $R_4$ are each selected to be —$OC_3H_6$—, the block copolymer is of the formula IIA3:

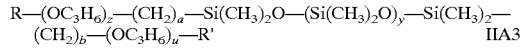
IIA3

When R is selected to be a hydrogen atom and R' is selected to be a hydroxyl group, the block copolymer is of the formula IIA3.1:

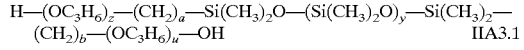
IIA3.1

When R is selected to be a methyl group and R' is selected to be a methoxy group, the block copolymer is of the formula IIA3.2:

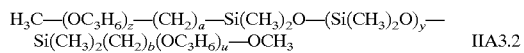
IIA3.2

When R is selected to be a methyl group and R' is selected to be a hydroxyl group, the block copolymer is of the formula IIA3.3:

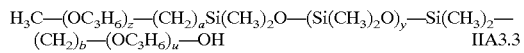
IIA3.3

When, for block copolymers of Formula IIA, $R_2$ and $R_4$ are each selected to be —$OC_2H_4$—, the block copolymer is of the formula IIA4:

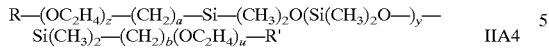

IIA4

When R is selected to be a hydrogen atom and R' is selected to be a hydroxyl group, the block copolymer is of the formula IIA4.1:

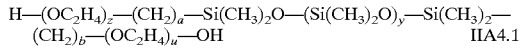

IIA4.1

When R is selected to be a methyl group and R' is selected to be a methoxy group, the block copolymer is of the formula IIA4.2:

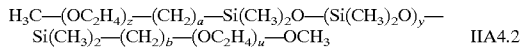

IIA4.2

When R is selected to be a methyl group and R' is selected to be a hydroxyl group, the block copolymer is of the formula IIA4.3:

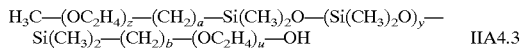

IIA4.3

When, for block copolymers of Formula IIA, $R_2$ is selected to be —$OC_3H_6$— and $R_4$ is selected to be —$C_3H_6O$—, the block copolymer is of the formula IIA5:

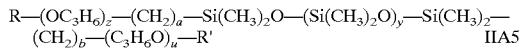

IIA5

When R and R' are each selected to be hydrogen atoms, the block copolymer is of the formula IIA5.1:

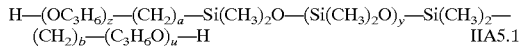

IIA5.1

When R and R' are each selected to be methyl groups, the block copolymer is of the formula IIA5.2:

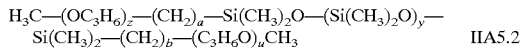

IIA5.2

When R is selected to be a hydrogen atom and R' is selected to be a methyl group, the block copolymer is of the formula IIA5.3:

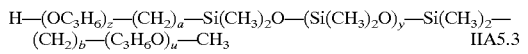

IIA5.3

When, for block copolymers of Formula IIA, $R_2$ is selected to be —$OC_2H_4$— and $R_4$ is selected to be —$C_2H_4O$—, the block copolymer is of the formula IIA6:

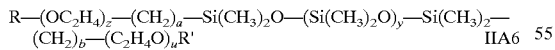

IIA6

When R and R' are each selected to be hydrogen atoms, the block copolymer is of the formula IIA6.1:

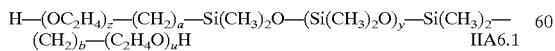

IIA6.1

When R and R' are each selected to be methyl groups, the block copolymer is of the formula IIA6.2:

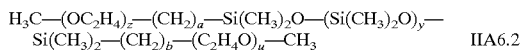

IIA6.2

When R is selected to be a hydrogen atom and R' is selected to be a methyl group, the block copolymer is of the formula IIA6.3:

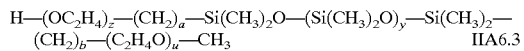

IIA6.3

Type 2 block copolymers (those of Formula III and Formula IV) have a B block with one or more alkyaryllsiloxane repeat monomer units, wherein the alkyl group of the alkylarylsiloxane has from 1 to about 10 carbon atoms and the aryl group of the alkylarylsiloxane has from 6 to about 20 carbon atoms. Type 2 materials include, but are not limited to, the following:

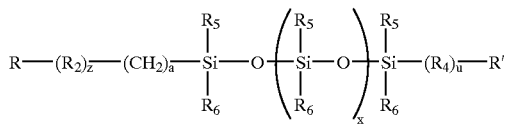

III wherein R and R' each, independently of the other, can be hydrogen atoms, hydroxyl groups, alkyl groups (including linear, branched, and cyclic alkyl groups), hydroxyl-substituted alkyl groups (including hydroxyl-substituted linear, branched, and cyclic alkyl groups), alkoxy groups (including alkoxy groups with linear, branched, and cyclic alkyl moieties), aryl groups, hydroxyl-substituted aryl groups, aryloxy groups, or heterocyclic groups (wherein the heteroatom can be, but is not limited to, oxygen, nitrogen, phosphorus, silicon, sulfur, or the like), wherein the alkyl, hydroxyl-substituted alkyl, alkoxy, aryl, hydroxyl-substituted aryl, aryloxy, and heterocyclic groups typically have from 1 to about 30 carbon atoms, although the number of carbon atoms can be outside of this range, $R_5$ is an alkyl group (including linear, branched, and cyclic alkyl groups) typically with from 1 to about 10 carbon atoms, although the number of carbon atoms can be outside of this range, $R_6$ is an aryl group (such as phenyl ($\phi$) and the like), typically with from 6 to about 20 carbon atoms, although the number of carbon atoms can be outside of this range, $R_2$ and $R_4$ each, independently of the other, are $(OC_nH_{2n})$ or $(C_nH_{2n}O)$, wherein within each of $R_2$ and $R_4$ n has an average value of from 2 to 3, u and z each, independently of the other, are integers of from 1 to about 15,000, and x is an integer of from 1 to about 15,000.

In the block copolymers of Formula III, one spacer group is an alkylarylsiloxy group and one spacer group is an alkylarylsilyl group. The following types of linkages between the alkylarylsilyl or alkylarylsiloxy groups and the alkylene oxide groups are possible:

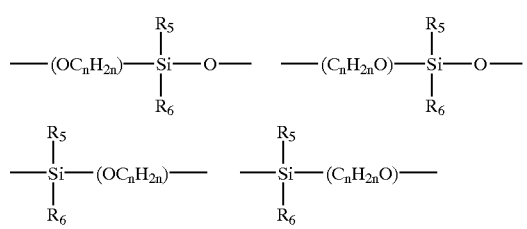

For example, when $R_5$ is selected as a methyl group and $R_6$ is selected as a phenyl group ($\phi$), the block copolymer is of Formula IIIA:

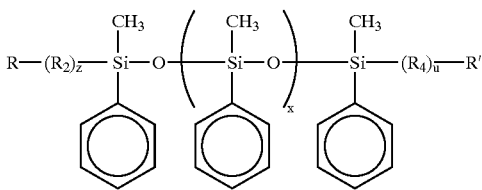

IIIA wherein R, R', $R_2$, $R_4$, z, x, and u are as defined hereinabove for block copolymers of Formula III.

When, for block copolymers of Formula IIIA, $R_2$ and $R_4$ are each selected to be —$C_3H_6O$—, the block copolymer is of the formula IIIA1:

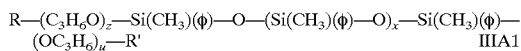
IIIA1

When R and R' are each selected to be hydroxyl groups, the block copolymer is of the formula IIIA1.1:

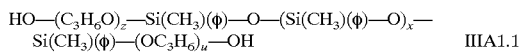
IIIA1.1

When R and R' are each selected to be methoxy groups, the block copolymer is of the formula IIIA1.2:

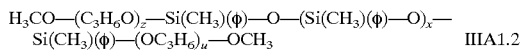
IIIA1.2

When R is selected to be a hydroxyl group and R' is selected to be a methoxy group, the block copolymer is of the formula IIIA1.3:

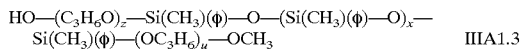
IIIA1.3

When, for block copolymers of Formula IIIA, $R_2$ and $R_4$ are each selected to be —$C_2H_4O$—, the block copolymer is of the formula IIIA2:

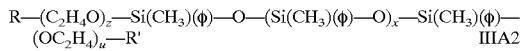
IIIA2

When R and R' are each selected to be hydroxyl groups, the block copolymer is of the formula IIIA2.1:

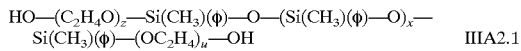
IIIA2.1

When R and R' are each selected to be methoxy groups, the block copolymer is of the formula IIIA2.2:

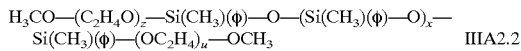
IIIA2.2

When R is selected to be a hydroxyl group and R' is selected to be a methoxy group, the block copolymer is of the formula IIIA2.3:

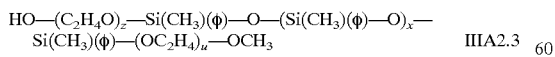
IIIA2.3

When, for block copolymers of Formula IIIA, $R_2$ and $R_4$ are each selected to be —$OC_3H_6$—, the block copolymer is of the formula IIIA3:

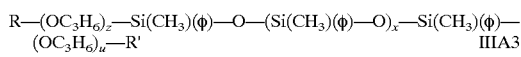
IIIA3

When R is selected to be a hydrogen atom and R' is selected to be a hydroxyl group, the block copolymer is of the formula IIIA3.1:

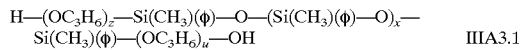
IIIA3.1

When R is selected to be a methyl group and R' is selected to be a methoxy group, the block copolymer is of the formula IIIA3.2:

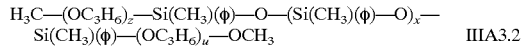
IIIA3.2

When R is selected to be a methyl group and R' is selected to be a hydroxyl group, the block copolymer is of the formula IIIA3.3:

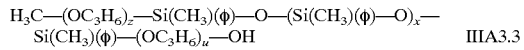
IIIA3.3

When, for block copolymers of Formula IIIA, $R_2$ and $R_4$ are each selected to be —$OC_2H_4$—, the block copolymer is of the formula IIIA4:

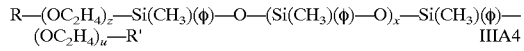
IIIA4

When R is selected to be a hydrogen atom and R' is selected to be a hydroxyl group, the block copolymer is of the formula IIIA4.1:

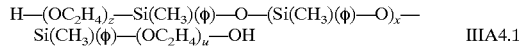
IIIA4.1

When R is selected to be a methyl group and R' is selected to be a methoxy group, the block copolymer is of the formula IIIA4.2:

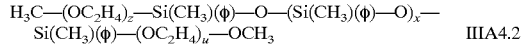
IIIA4.2

When R is selected to be a hydrogen atom and R' is selected to be a methoxy group, the block copolymer is of the formula IIIA4.3:

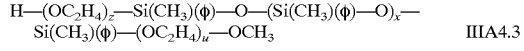
IIIA4.3

When, for block copolymers of Formula IIIA, $R_2$ is selected to be —$OC_3H_6$— and $R_4$ is selected to be —$C_3H_6O$—, the block copolymer is of the formula IIIA5:

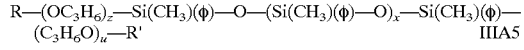
IIIA5

When R and R' are each selected to be hydrogen atoms, the block copolymer is of the formula IIIA5.1:

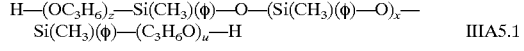
IIIA5.1

When R and R' are each selected to be methyl groups, the block copolymer is of the formula IIIA5.2:

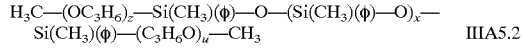
IIIA5.2

When R is selected to be a hydrogen atom and R' is selected to be a methyl group, the block copolymer is of the formula IIIA5.3:

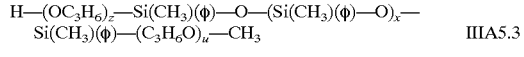
IIIA5.3

When, for block copolymers of Formula IIIA, $R_2$ is selected to be —$OC_2H_4$— and $R_4$ is selected to be —$C_2H_4O$—, the block copolymer is of the formula IIIA6:

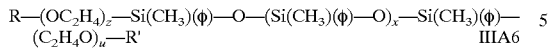
R—$(OC_2H_4)_z$—$Si(CH_3)(\phi)$—O—$(Si(CH_3)(\phi)$—$O)_x$—$Si(CH_3)(\phi)$—$(C_2H_4O)_u$—R'  IIIA6

When R and R' are each selected to be hydrogen atoms, the block copolymer is of the formula IIIA6.1:

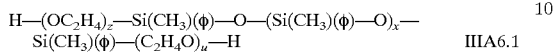
H—$(OC_2H_4)_z$—$Si(CH_3)(\phi)$—O—$(Si(CH_3)(\phi)$—$O)_x$—$Si(CH_3)(\phi)$—$(C_2H_4O)_u$—H  IIIA6.1

When R and R' are each selected to be methyl groups, the block copolymer is of the formula IIIA6.2:

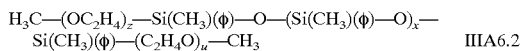
$H_3C$—$(OC_2H_4)_z$—$Si(CH_3)(\phi)$—O—$(Si(CH_3)(\phi)$—$O)_x$—$Si(CH_3)(\phi)$—$(C_2H_4O)_u$—$CH_3$  IIIA6.2

When R is selected to be a hydrogen atom and R' is selected to be a methyl group, the block copolymer is of the formula IIIA6.3:

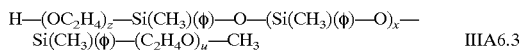
H—$(OC_2H_4)_z$—$Si(CH_3)(\phi)$—O—$(Si(CH_3)(\phi)$—$O)_x$—$Si(CH_3)(\phi)$—$(C_2H_4O)_u$—$CH_3$  IIIA6.3

Type 2 materials also include, but are not limited to, the following:

IV

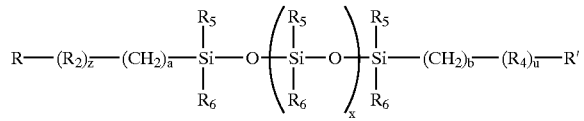

wherein R and R' each, independently of the other, can be hydrogen atoms, hydroxyl groups, alkyl groups (including linear, branched, and cyclic alkyl groups), hydroxyl-substituted alkyl groups (including hydroxyl-substituted linear, branched, and cyclic alkyl groups), alkoxy groups (including alkoxy groups with linear, branched, and cyclic alkyl moieties), aryl groups (such as phenyl ($\phi$) and the like), hydroxyl-substituted aryl groups, aryloxy groups, or heterocyclic groups (wherein the heteroatom can be, but is not limited to, oxygen, nitrogen, phosphorus, silicon, sulfur, or the like), wherein the alkyl, hydroxyl-substituted alkyl, alkoxy, aryl, hydroxyl-substituted aryl, aryloxy, and heterocyclic groups typically have from 1 to about 30 carbon atoms, although the number of carbon atoms can be outside of this range, $R_5$ is an alkyl group (including linear, branched, and cyclic alkyl groups) typically with from 1 to about 10 carbon atoms, although the number of carbon atoms can be outside of this range, $R_6$ is an aryl group, typically with from 6 to about 20 carbon atoms, although the number of carbon atoms can be outside of this range, $R_2$ and $R_4$ each, independently of the other, are ($OC_nH_{2n}$) or ($C_nH_{2n}O$), wherein within each of $R_2$ and $R_4$ n has an average value of from 2 to 3, u and z each, independently of the other, are integers of from 1 to about 15,000, x is an integer of from 1 to about 15,000, and a and b each, independently of the other, are integers of from 0 to about 10, wherein the sum of a+b≧2. In the block copolymers of Formula IV, one spacer group is a combination of an alkylene group and an alkylarylsiloxy group and one spacer group is a combination of an alkylene group and an alkylarylsilyl group. The following types of linkages between the spacer groups and the alkylene oxide groups are possible:

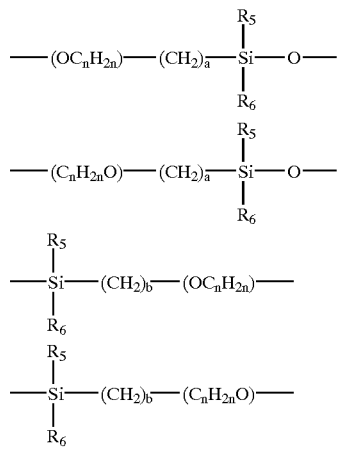

For example, when $R_5$ is selected as a methyl group and $R_6$ is selected as a phenyl ($\phi$) group, the block copolymer is of Formula IVA:

IVA

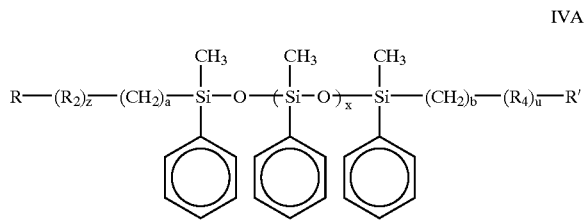

wherein R, R', $R_2$, $R_4$, z, x, u, a, and b are as defined hereinabove for polymers of Formula IV.

When, for block copolymers of Formula IVA, $R_2$ is selected to be —$C_3H_6O$— and $R_4$ is selected to be —$OC_3H_6$—, the block copolymer is of the formula IVA1:

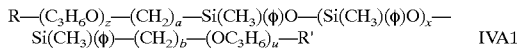
R—$(C_3H_6O)_z$—$(CH_2)_a$—$Si(CH_3)(\phi)O$—$(Si(CH_3)(\phi)O)_x$—$Si(CH_3)(\phi)$—$(CH_2)_b$—$(OC_3H_6)_u$—R'  IVA1

When R and R' are each selected to be hydroxyl groups, the block copolymer is of the formula IVA1.1:

HO—$(C_3H_6O)_z$—$(CH_2)_a$—$Si(CH_3)(\phi)O$—$(Si(CH_3)(\phi)O)_x$—$Si(CH_3)(\phi)$—$(CH_2)_b$—$(OC_3H_6)_u$—OH  IVA1.1

When R and R' are each selected to be methoxy groups, the block copolymer is of the formula IVA1.2:

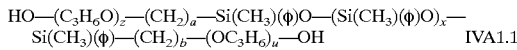
$H_3CO$—$(C_3H_6O)_z$—$(CH_2)_a$—$Si(CH_3)(\phi)O$—$(Si(CH_3)(\phi)O)_x$—$Si(CH_3)(\phi)$—$(CH_2)_b$—$(OC_3H_6)_u$—$OCH_3$  IVA1.2

When R is selected to be a hydroxyl group and R' is selected to be a methoxy group, the block copolymer is of the formula IVA 1.3:

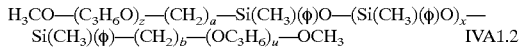
HO—$(C_3H_6O)_z$—$(CH_2)_a$—$Si(CH_3)(\phi)O$—$(Si(CH_3)(\phi)O)_x$—$Si(CH_3)(\phi)$—$(CH_2)_b$—$(OC_3H_6)_u$—$OCH_3$  IVA1.3

When, for block copolymers of Formula IVA, $R_2$ is selected to be —$C_2H_4O$— and $R_4$ is selected to be —$OC_2H_4$—, the block copolymer is of the formula IVA2:

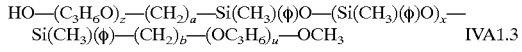
R—$(C_2H_4O)_z$—$(CH_2)_a$—$Si(CH_3)(\phi)O$—$(Si(CH_3)(\phi)O)_x$—$Si(CH_3)(\phi)$—$(CH_2)_b$—$(OC_2H_4)_u$—R'  IVA2

When R and R' are each selected to be hydroxyl groups, the block copolymer is of the formula IVA2.1:

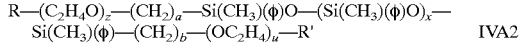

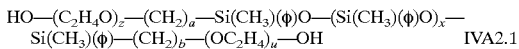
$$HO-(C_2H_4O)_z-(CH_2)_a-Si(CH_3)(\phi)O-(Si(CH_3)(\phi)O)_x-$$
$$Si(CH_3)(\phi)-(CH_2)_b-(OC_2H_4)_u-OH \qquad IVA2.1$$

When R and R' are each selected to be methoxy groups, the block copolymer is of the formula IVA2.2:

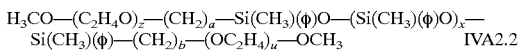
$$H_3CO-(C_2H_4O)_z-(CH_2)_a-Si(CH_3)(\phi)O-(Si(CH_3)(\phi)O)_x-$$
$$Si(CH_3)(\phi)-(CH_2)_b-(OC_2H_4)_u-OCH_3 \qquad IVA2.2$$

When R is selected to be a hydroxyl group and R' is selected to be a methoxy group, the block copolymer is of the formula IVA2.3:

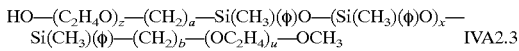
$$HO-(C_2H_4O)_z-(CH_2)_a-Si(CH_3)(\phi)O-(Si(CH_3)(\phi)O)_x-$$
$$Si(CH_3)(\phi)-(CH_2)_b-(OC_2H_4)_u-OCH_3 \qquad IVA2.3$$

An example of a material of Formula IVA2 having a spacer group S which is —$(CH_2)_3$—$Si(CH_3)(\phi)$—O— and a spacer group S' which is —$Si(CH_3)(\phi)$—$(CH_2)_3$— is the following:

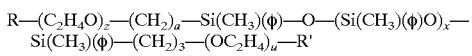
$$R-(C_2H_4O)_z-(CH_2)_a-Si(CH_3)(\phi)-O-(Si(CH_3)(\phi)O)_x-$$
$$Si(CH_3)(\phi)-(CH_2)_3-(OC_2H_4)_u-R'$$

When, for block copolymers of Formula IVA, $R_2$ and $R_4$ are each selected to be —$OC_3H_6$—, the block copolymer is of the formula IVA3:

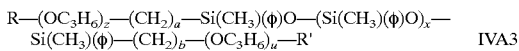
$$R-(OC_3H_6)_z-(CH_2)_a-Si(CH_3)(\phi)O-(Si(CH_3)(\phi)O)_x-$$
$$Si(CH_3)(\phi)-(CH_2)_b-(OC_3H_6)_u-R' \qquad IVA3$$

When R is selected to be a hydrogen atom and R' is selected to be a hydroxyl group, the block copolymer is of the formula IVA3.1:

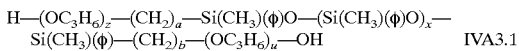
$$H-(OC_3H_6)_z-(CH_2)_a-Si(CH_3)(\phi)O-(Si(CH_3)(\phi)O)_x-$$
$$Si(CH_3)(\phi)-(CH_2)_b-(OC_3H_6)_u-OH \qquad IVA3.1$$

When R is selected to be a methyl group and R' is selected to be a methoxy group, the block copolymer is of the formula IVA3.2:

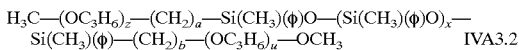
$$H_3C-(OC_3H_6)_z-(CH_2)_a-Si(CH_3)(\phi)O-(Si(CH_3)(\phi)O)_x-$$
$$Si(CH_3)(\phi)-(CH_2)_b-(OC_3H_6)_u-OCH_3 \qquad IVA3.2$$

When R is selected to be a methyl group and R' is selected to be a hydroxyl group, the block copolymer is of the formula IVA3.3:

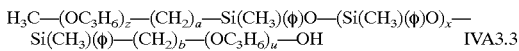
$$H_3C-(OC_3H_6)_z-(CH_2)_a-Si(CH_3)(\phi)O-(Si(CH_3)(\phi)O)_x-$$
$$Si(CH_3)(\phi)-(CH_2)_b-(OC_3H_6)_u-OH \qquad IVA3.3$$

When, for block copolymers of Formula IVA, $R_2$ and $R_4$ are each selected to be —$OC_2H_4$—, the block copolymer is of the formula IVA4:

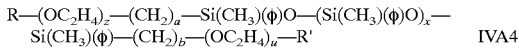
$$R-(OC_2H_4)_z-(CH_2)_a-Si(CH_3)(\phi)O-(Si(CH_3)(\phi)O)_x-$$
$$Si(CH_3)(\phi)-(CH_2)_b-(OC_2H_4)_u-R' \qquad IVA4$$

When R is selected to be a hydrogen atom and R' is selected to be a hydroxyl group, the block copolymer is of the formula IVA4.1:

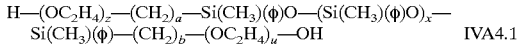
$$H-(OC_2H_4)_z-(CH_2)_a-Si(CH_3)(\phi)O-(Si(CH_3)(\phi)O)_x-$$
$$Si(CH_3)(\phi)-(CH_2)_b-(OC_2H_4)_u-OH \qquad IVA4.1$$

When R is selected to be a methyl group and R' is selected to be a methoxy group, the block copolymer is of the formula IVA4.2:

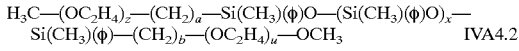
$$H_3C-(OC_2H_4)_z-(CH_2)_a-Si(CH_3)(\phi)O-(Si(CH_3)(\phi)O)_x-$$
$$Si(CH_3)(\phi)-(CH_2)_b-(OC_2H_4)_u-OCH_3 \qquad IVA4.2$$

When R is selected to be a methyl group and R' is selected to be a hydroxyl group, the block copolymer is of the formula IVA4.3:

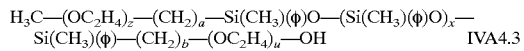
$$H_3C-(OC_2H_4)_z-(CH_2)_a-Si(CH_3)(\phi)O-(Si(CH_3)(\phi)O)_x-$$
$$Si(CH_3)(\phi)-(CH_2)_b-(OC_2H_4)_u-OH \qquad IVA4.3$$

When, for block copolymers of Formula IVA, $R_2$ is selected to be —$OC_3H_6$— and $R_4$ is selected to be —$C_3H_6O$—, the block copolymer is of the formula IVA5:

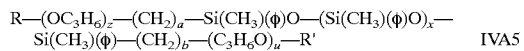
$$R-(OC_3H_6)_z-(CH_2)_a-Si(CH_3)(\phi)O-(Si(CH_3)(\phi)O)_x-$$
$$Si(CH_3)(\phi)-(CH_2)_b-(C_3H_6O)_u-R' \qquad IVA5$$

When R and R' are each selected to be hydrogen atoms, the block copolymer is of the formula IVA5.1:

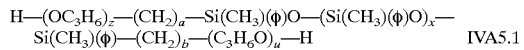
$$H-(OC_3H_6)_z-(CH_2)_a-Si(CH_3)(\phi)O-(Si(CH_3)(\phi)O)_x-$$
$$Si(CH_3)(\phi)-(CH_2)_b-(C_3H_6O)_u-H \qquad IVA5.1$$

When R and R' are each selected to be methyl groups, the block copolymer is of the formula IVA5.2:

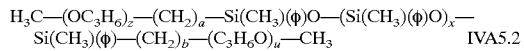
$$H_3C-(OC_3H_6)_z-(CH_2)_a-Si(CH_3)(\phi)O-(Si(CH_3)(\phi)O)_x-$$
$$Si(CH_3)(\phi)-(CH_2)_b-(C_3H_6O)_u-CH_3 \qquad IVA5.2$$

When R is selected to be a hydrogen atom and R' is selected to be a methyl group, the block copolymer is of the formula IVA5.3:

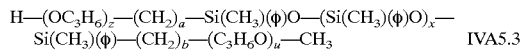
$$H-(OC_3H_6)_z-(CH_2)_a-Si(CH_3)(\phi)O-(Si(CH_3)(\phi)O)_x-$$
$$Si(CH_3)(\phi)-(CH_2)_b-(C_3H_6O)_u-CH_3 \qquad IVA5.3$$

When, for block copolymers of Formula IVA, $R_2$ is selected to be —$OC_2H_4$— and $R_4$ is selected to be —$C_2H_4O$—, the block copolymer is of the formula IVA6:

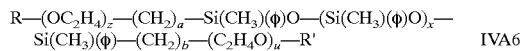
$$R-(OC_2H_4)_z-(CH_2)_a-Si(CH_3)(\phi)O-(Si(CH_3)(\phi)O)_x-$$
$$Si(CH_3)(\phi)-(CH_2)_b-(C_2H_4O)_u-R' \qquad IVA6$$

When R and R' are each selected to be hydrogen atoms, the block copolymer is of the formula IVA6.1:

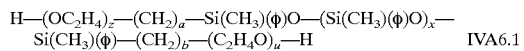
$$H-(OC_2H_4)_z-(CH_2)_a-Si(CH_3)(\phi)O-(Si(CH_3)(\phi)O)_x-$$
$$Si(CH_3)(\phi)-(CH_2)_b-(C_2H_4O)_u-H \qquad IVA6.1$$

When R and R' are each selected to be methyl groups, the block copolymer is of the formula IVA6.2:

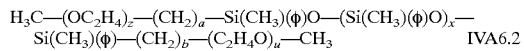
$$H_3C-(OC_2H_4)_z-(CH_2)_a-Si(CH_3)(\phi)O-(Si(CH_3)(\phi)O)_x-$$
$$Si(CH_3)(\phi)-(CH_2)_b-(C_2H_4O)_u-CH_3 \qquad IVA6.2$$

When R is selected to be a hydrogen atom and R' is selected to be a methyl group, the block copolymer is of the formula IVA6.3:

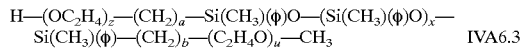
$$H-(OC_2H_4)_z-(CH_2)_a-Si(CH_3)(\phi)O-(Si(CH_3)(\phi)O)_x-$$
$$Si(CH_3)(\phi)-(CH_2)_b-(C_2H_4O)_u-CH_3 \qquad IVA6.3$$

In Formula IV, if a and b are each 3, the optional spacer S and S' groups can each be independently selected from propylenylmethylphenylsiloxy (an example of propylenylalkylarylsiloxy) and propylenylmethylphenylsilyl (an example of propylenylalkylarylsilyl) groups.

Further specific embodiments not expressly shown herein are also encompassed within Formulae I, II, III, and IV.

Alkylene oxide/siloxane copolymers suitable for the inks of the present invention are commercially available from, for example, Dow Corning Co., Midland, Mich. and Aldrich Chemical Co., Milwaukee, Wis.

In addition, alkylene oxide/siloxane copolymers suitable for the inks of the present invention can be obtained by the reaction of a hydride terminated polydialkyl siloxane (for example, polydimethylsiloxane, H—$Si(CH_3)_2$—O—$(Si(CH_3)_2$—$O)_y$—$Si(CH_3)_2H)$ with polyols (—OH containing groups) containing polyethyleneoxide units, polypropyleneoxide units, or a mixture thereof in the presence of metal catalyst (for example, zinc chlorides, zinc acetates, zinc octoates, iron chlorides, iron acetates, iron octoates, tin chlorides, tin acetates, tin octoates, platinum complexes, dibutyl tin dilaurate, tributyl tin oxide, dibutyl aceloxylin, Pd/C, or the like).

Further, alkylene oxide/siloxane copolymers suitable for the inks of the present invention can be obtained by the reaction of a hydride terminated polydialkyl siloxane (for example, polydimethylsiloxane, $H-Si(CH_3)_2-O-(Si(CH_3)_2-O)_y-Si(CH_3)_2H$) with vinyl or allyl ethers of polyols (containing one —OH group or one ether group), including those materials containing polyethyleneoxide units, polypropyleneoxide units, or a mixture thereof in the presence of a metal catalyst (for example, zinc chlorides, zinc acetates, zinc octoates, iron chlorides, iron acetates, iron octoates, tin chlorides, tin acetates, tin octoates, platinum complexes, dibutyl tin dilaurate, tributyl tin oxide, dibutyl acetoxytin, Pd/C, or the like).

Exemplary reactions (each taking place in the presence of one or more metal catalysts) are as follows:

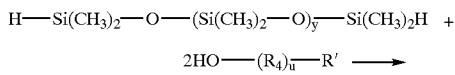
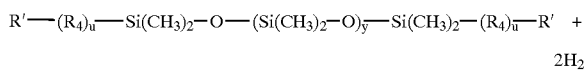
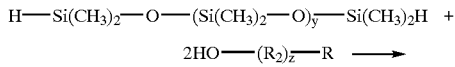
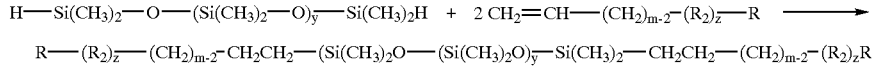
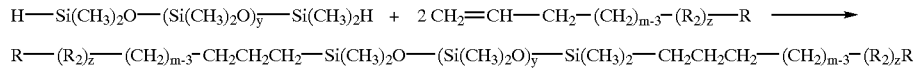

-continued

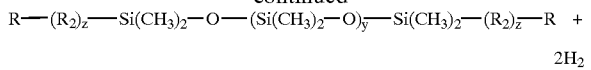
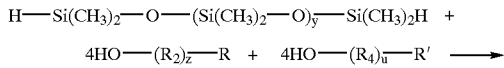
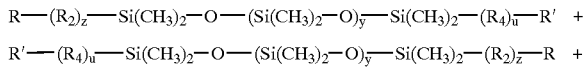
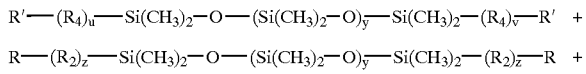

wherein R, R', $R_2$, $R_4$, u, z, and y are as defined hereinabove with respect to Formula I.

The following reactions (either with or without metal catalysts) can also be used to prepare ASBS'A' block copolymers for inks of the present invention:

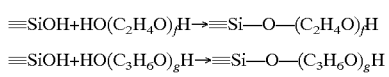

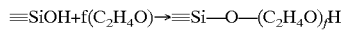
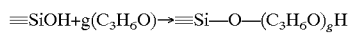
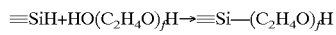
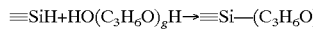
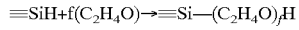
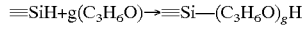
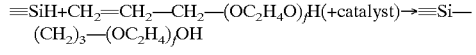
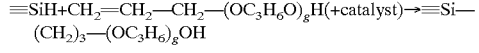

wherein f and g each, independently of the other, are integers of from 1 to about 15,000.

Alkylene oxide/siloxane copolymers suitable for the inks of the present invention can also be obtained by the reaction of a polydimethylsiloxane comprising two active terminal $\equiv SiH$ groups ($H-Si(CH_3)_2O-(Si(CH_3)_2O)_y-Si(CH_3)_2H$) with corresponding vinyl or ally group containing polyethyleneoxide, polypropyleneoxide, and/or mixture thereof in the presence of a metal catalyst.

Alkylene oxide/siloxane copolymers suitable for the inks of the present invention can also be obtained by the following reactions with vinyl or allyl compounds in the presence of a metal catalyst:

which can also be written as

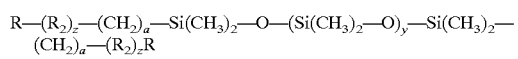

The coupling reaction of a hydropolysiloxane derivative (containing $\equiv SiH$) and a hydroxyl active material (HOR) such as polyethylene glycol, polypropylene glycol, mixed polyethyleneglycol and polypropylene glycol, alkyl ethers of polyethylene glycol, alkyl ethers of polypropylene glycol, alkyl ethers of mixed polyethyleneglycol and polypropylene glycol, or the like in the presence of a catalyst is possible. The coupling reaction of a polydimethylsiloxane derivative comprising two active terminal $\equiv SiH$ groups and an unsaturated material (with a double bond, such as vinyl or ally group containing polyethyleneoxide, polypropyleneoxide, or mixture thereof) in the presence of a metal catalyst is also known. Additional synthetic methods for the preparation of ASBS'A' block copolymers for the inks of the present invention are disclosed in, for example, *Silicon Compounds: Register and Review* (5$^{th}$ Edition), published by United Chemical Technologies, Inc. (Formally Hüls America, Inc. or Petrarch Systems, Inc., Bartram Road, Bristol, Pa. 19007), the disclosure of which is totally incorporated herein by reference.

The ABA' or ASBS'A' alkylene oxide/siloxane block copolymer is present in the ink of the present invention in any desired or effective amount, typically at least about 0.01 percent by weight of the ink, and preferably at least about 0.02 percent by weight of the ink, and typically no more than about 8 percent by weight of the ink, preferably no more than about 6 percent by weight of the ink, and more preferably no more than about 5 percent by weight of the ink, although the amount can be outside of these ranges.

The inks of the present invention can optionally include a jetting aid such as polyethylene oxide (typically in amounts of less than about 5 percent by weight) or a small quantity (typically less than about 0.2 percent by weight) of stabilized pigment particles. A preferred polyethylene oxide is one having a weight average molecular weight of about 18,500, although the molecular weight of the jetting aid can be different. Examples of inks containing preferred polyethylene oxides are disclosed in, for example, U.S. Pat. No. 5,207,825, the disclosure of which is totally incorporated herein by reference. The jetting aid provides smooth jetting or jetting with low jitter.

Other desired additives, including water soluble polymers, pH buffering agents, biocides, chelating agents (EDTA and the like), anticurl agents, antibleed agents, and other known ink additives can also optionally be used in the inks of the present invention. Such additives can generally be added to the inks in known amounts for their known purposes.

Additives such as surfactants (or wetting agents), anti-curl agents, anti-intercolor bleed agents, and anticlogging agents can also be added to the inks of the present invention. Some of these surfactants can be of the anionic, cationic, or nonionic types. Suitable surfactants and wetting agents include, but are not limited to, Tamol SN®, Tamol LG®, and Triton® series (Rohm and Haas Co.); Marasperse® series; Igepal® series (Rhone-Poulenc Co., formerly from GAF Co.); Tergitol® series; Duponol® series (E.I. Du Pont de Nemours & Co.); Surfynol Series (Air Products Inc.); Iconol® Series (BASF Co.); Brij® Series (ICI Americas Inc.); Pluronic® Series (BASF Co.); Emulphor® ON 870 and ON 877 (GAF); and other commercially available surfactants. These surfactants (or dispersants) and wetting agents can be present in the ink in effective amounts, generally from 0 to about 15 percent by weight of the ink, preferably from about 0.001 to about 10 percent by weight of the ink, and more preferably from about 0.01 to about 5 percent by weight of the ink, although the amount can be outside of these ranges.

Polymeric additives can also be added to the inks for the present invention to enhance the viscosity or smear resistance of the ink. Suitable polymeric additives include, but are not limited to, water soluble polymers and random copolymers such as Gum Arabic, salts, polyvinyl alcohols, polyvinyl sulfonate salts, polyhydroxypropylcellulose, polyhydroxyethylcellulose, polyvinylpyrrolidinone, polyvinylether, starch, polysaccharides, carboxymethylcellulose salts, polyethyleneimines derivatized with ethylene oxide and/or propylene oxide, such as the Discole® series (DKS International); the Jeffamine® series (Texaco); and the like as well as mixtures thereof. Polymeric additives can be present in the ink in amounts of from 0 to about 10 percent by weight of the ink, preferably from about 0.001 to about 8 percent by weight of the ink, and more preferably from about 0.01 to about 5 percent by weight of the ink, although the amount can be outside of these ranges.

Other optional additives include, but are not limited to, biocides such as Dowicil® 150, 200, and 75, benzoate salts, sorbate salts, Proxcel® (available from ICI), and the like. When used, such biocides are generally present in an amount of from 0 to about 10 percent by weight of the ink, preferably from about 0.001 to about 8 percent by weight of the ink, and more preferably from about 0.01 to about 4.0 percent by weight of the ink, although the amount can be outside of these ranges. Inks for the present invention can also include pH controlling (buffering) agents. Suitable pH controlling agents or buffering agents include, but are not limited to, acids, bases, phosphate salts, carboxylate salts, sulfite salts, sulfate salts, amine salts, and the like. Such pH controlling agents (buffering agents) are generally present in an amount of from 0 to about 10 percent by weight of the ink, preferably from about 0.001 to about 7.5 percent by weight of the ink, and more preferably from about 0.01 to about 5 percent by weight of the ink, although the amount can be outside of these ranges.

The ink compositions can be of any desired or suitable viscosity. For thermal ink jet printing applications, for example, the viscosity can be up to about 25 centipoise at about 25° C., preferably being below about 10 centipoise at about 25° C., and more preferably being below about 5 centipoise at about 25° C., although the viscosity can be outside these ranges, particularly for applications other than thermal ink jet printing, such as acoustic ink jet printing or the like.

Inks of the present invention exhibit fast drying rates, low intercolor bleed, and reduced smearing. While not being limited to any particular theory, it is believed that the inks of the present invention can provide a hydrophobic layer near the border area between two different inks printed adjacent to one another, thereby inhibiting intercolor bleed. Also, the inks of the present invention can dry faster on a print substrate (possibly because of reduced surface tension) and avoid residual ink on the surface of a print substrate that might result in intercolor bleed with adjacent inks. In addition, since the inks of the present invention do not react with many common ink jet ingredients, including colorants, they can be used in conjunction with many other ink compositions in a single partitioned printhead without resulting in undesired ink mixing, colorant precipitation, or printhead clogging.

The present invention is also directed to a process which entails incorporating an ink composition of the present invention into an ink jet printing apparatus and causing droplets of the ink composition to be ejected in an imagewise pattern onto a print substrate. In one particularly preferred embodiment, the printing apparatus employs a thermal ink jet process wherein the ink in the nozzles is selectively heated in an imagewise pattern according to digital signals, thereby causing droplets of the ink to be ejected in imagewise pattern onto the print substrate. In another embodiment, the printing apparatus employs an acoustic ink jet process wherein droplets of the ink are caused to be ejected in imagewise pattern onto the print substrate by acoustic beams (waves). The inks of the present invention can be printed in a multicolor ink jet printer in conjunction with other ink jet inks in any desired printing sequence or printing order, such as (a) yellow, cyan, magenta, black, (b) yellow, magenta, cyan, black, (c) cyan, yellow, magenta, black, (d) magenta, yellow, cyan, black, (e) black, cyan, magenta, yellow, (f) black, magenta, cyan, yellow, or the like. In particular, the ink containing the ASBS'A' block copolymer can be printed onto the substrate either before or after the ink that contains no ASBS'A' block copolymer.

The print substrate employed can be any substrate compatible with aqueous inks. Suitable substrates include, but are not limited to, textiles; plain papers, such as Xerox® series 10, Xerox® 4024, Xerox® Digital Paper, Xerox® Image Series LX Paper, Hewlett-Packard® BrightWhite Ink Jet plain paper, Georgia Pacific® Microprint Ink Jet paper 24 lb, Xerox® 4200 DP paper, Rank Xerox® Plain Paper, Japanese Hokuetsu L Plain Paper, Fuji Xerox® Kakusaku L paper, various Japanese plain papers, Strathmore® Legacy paper, Ampad® Premium grade paper, Hammermill® Jet Print paper, Hammermill® Tidal DP paper, GP Microprint paper, Weyerhaeuser® Jet-Xtra paper, Boise® Cascade paper, Union Camp® Great White Recycled paper, Union Camp® Top Gun ink jet paper, Champion® paper, commercial bond papers and the like; coated papers (or special ink jet papers including photo-realistic ink jet papers) such as those available from Hewlett-Packard, Canon, Eastman Kodak, Oji Paper, 3M, Mitsubishi, Polaroid, Lexmark, Epson, and Xerox; ink jet transparencies suitable for aqueous inks or ink jet printing processes, including those from Arkwright, Hewlett-Packard, Canon, Asahi, Lexmark, Epson, Eastman Kodak, Polaroid, and Xerox; and the like, as well as materials from other commercial sources, including textiles.

Another embodiment of the present invention is directed to a set of inks for printing multicolor images in an ink jet printer, said ink set comprising (1) a first ink having a first color and comprising water and a first colorant; and (2) a second ink having a second color different from the first color and comprising water, a second colorant, and a linear ABA' or ASBS'A' block copolymer wherein the A and A' blocks are each, independently of the other, polymers of ethylene oxide, propylene oxide, or mixtures of ethylene oxide and propylene oxide, the B block is a polymer of a dialkylsiloxane, alkyl aryl siloxane, or diarylsiloxane, S is an optional spacer group between the A and B blocks, and S' is an optional spacer group between the B and A' blocks, wherein dry time of the ink containing the block copolymer is decreased and/or intercolor bleed between the first ink and the second ink is reduced when the second ink is printed adjacent to, on top of, or underneath the first ink on a print substrate. Yet another embodiment of the present invention is directed to a multicolor ink jet printing process which comprises: (1) incorporating into an ink jet printer a first ink having a first color and comprising water and a first colorant; (2) incorporating into the ink jet printer a second ink having a second color different from the first color and comprising water, a second colorant, and a linear ABA' or ASBS'A' block copolymer wherein the A and A' blocks are each, independently of the other, polymers of ethylene oxide, propylene oxide, or mixtures of ethylene oxide and propylene oxide, the B block is a polymer of a dialkylsiloxane, alkyl aryl siloxane, or diarylsiloxane, S is an optional spacer group between the A and B blocks, and S' is an optional spacer group between the B and A' blocks; (3) causing droplets of the first ink to be ejected in an imagewise pattern onto a substrate; and (4) causing droplets of the second ink to be ejected in an imagewise pattern onto the substrate, wherein dry time of the ink containing the block copolymer is decreased and/or intercolor bleed between the first ink and the second ink is reduced when the second ink is printed adjacent to, on top of, or underneath the first ink on the substrate. In these embodiments, the first ink can also include additional ingredients, such as humectants, cosolvents, or other water soluble or miscible organic compounds as set forth hereinabove, and other optional ingredients as set forth hereinabove. The colorant for the first ink can be a dye, a pigment (either with or without surface modification by the attachment of water ionizable functional groups on the pigment particles), or a mixture thereof, and can include colorant stabilizing or dispersing agents as set forth hereinabove.

In the aforementioned multicolor ink jet printing process, dry time of the first ink can be reduced especially when the first ink is printed on top of the second ink, which has a low surface tension and accelerates the penetration of the first ink into substrate. The block copolymer in the ink of the present invention (second ink) can decrease dry time and improve image uniformity (without mottle) of the second ink on the print substrate.

Although in some cases it can be preferred to print the second ink comprising the block copolymer of the present invention underneath the first ink that may have a slow drying characteristic (underprinting with the second ink), other printing sequences can also be used. The printing of the second ink of the present invention comprising the block copolymer can be carried out in partial tone (such as tone of $1/128$, $1/64$, $1/32$, $1/16$, $1/8$, $1/4$, $1/2$, or the like), full tone, dot on dot, or any desired ink coverage (different inking patterns).

In all the aforementioned multicolor ink jet printing processes of the present invention, optional heating of the print substrate can be carried out at any stage of ink jet printing process, including during printing, before printing, after printing, and combinations thereof with any desired or effective heating method, including, but not limited to, radiant heating, heated plate, heated belt, heated roller, heated drum, microwave device, hot air, or the like.

In all the aforementioned ink jet printing processes of the present invention, high resolution ink jet printheads can be used (with resolution $\geq 300$ spi, such as 400 spi, 600 spi, 1200 spi, or the like) to achieve high resolution images on a print substrate (including monocolor images, multicolor images, or the like). The ink jet printhead can be a single printhead, a partitioned printhead, a partial width array printhead, a full width array printhead, or the like. These ink jet printheads can be continuous or drop-on-demand types, including thermal ink jet printheads, piezoelectric ink jet printheads, acoustic ink jet printheads, or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A black ink jet ink composition (a "first ink" in a multicolor ink jet printing process of the present invention) was prepared by mixing 29.8 parts by weight of sulfolane (obtained from Phillips Petroleum Co.), 6 parts by weight of 2-pyrrolidinone (obtained from Aldrich Chemical Co.), 0.05 parts by weight of polyethylene oxide with a molecular weight of 18,500 (obtained from Polysciences), and water. The ingredients were stirred for about 5 to 10 minutes to obtain a homogeneous mixture. One percent by weight of the polysiloxane-polyether copolymer Tegopren 5884 (containing 33.5 percent by weight of the polysiloxane-polyether copolymer in solution; obtained from Goldschmidt) was added to the mixture and stirred for about 10 minutes to obtain a homogeneous mixture.

An acrylic resin emulsion comprising resins was derived from 23.6 percent by weight of methacrylic acid, 55.4 percent by weight of benzyl methacrylate, 21 percent by weight of polyethyleneglycol methacrylate ($M_w$=246), 3 percent by weight of dodecanethiol, and 1 percent by weight of carbon tetrabromide. A one liter kettle equipped with a mechanical stirrer was charged with 240 grams of water, 1.8 grams of sodium dodecylbenzene sulfonate (obtained from Rhone-Poulenc as Rhodacal Ds-10), and 2 grams of Triton X-100 (alkylphenoxypolyethanol, obtained from Aldrich Chemical Co.), and the mixture was stirred for 2 hours at about 100 rpm. To this solution were then added 1.8 grams of ammonium persulfate, followed by the addition of a mixture containing 28.3 grams of methacrylic acid, 66.5 grams of benzyl methacrylate, 25.2 grams of polyethyleneglycol methacrylate ($M_w$=246), 3.6 grams of dodecanethiol, and 1.2 grams of carbon tetrabromide. The mixture was heated to 80° C. for 6 hours. Thereafter, the resin emulsion was cooled to room temperature, and a sample (about 10 grams) was freeze dried and analyzed by GPC. The resin had a number average molecular weight of about 20,580 and a weight average molecular weight of about 8,193, with a polydispersity of 2.5.

To the aforementioned homogeneous mixture was added dropwise a solution containing about 1.86 percent by weight of the acrylic resin emulsion (which contained 35 percent by weight latex solids), resulting in the addition to the liquid vehicle of 0.65 parts by weight of the latex, and the mixture was stirred for about 5 minutes. A solution containing Cabojet® 300 carbon black dispersion (IJX 164, obtained from Cabot Corporation) was slowly added into the above resultant mixture, resulting in an ink composition containing 3.3 parts by weight of the pigment. The ink mixture was stirred for 5 to about 10 minutes and then filtered through a one micron glass fiber filter. The final ink contained 3.3 parts by weight carbon black, 29.8 parts by weight sulfolane, 6 parts by weight 2-pyrrolidinone, 0.65 part by weight of the acrylic resin latex, 1 part by weight Tegopren® 5884, 0.05 part by weight polyethylene oxide, and about 59.2 parts by weight water (balance to 100 parts by weight total).

EXAMPLE II

A yellow ink jet ink composition (a "second ink" in a multicolor ink jet printing process of the present invention; referred to as Ink A in the table in Example IV below) was prepared by simple mixing of the following ingredients:

| Ingredient | Supplier | Amount (parts by weight) |
|---|---|---|
| deionized water | — | 9.285 |
| DOWICIL ® 150/200 biocide | Dow Chemical Co. | 0.1 |
| polyethylene oxide* | Polysciences | 0.05 |
| imidazole | BASF | 1 |
| ethylene diamine tetraacetic acid | Dow Chemical Co. | 0.065 |
| urea | Arcadian Corp. | 6 |
| sulfolane** | Phillips Petroleum Co. | 15 |
| acetylethanolamine*** | Scher Chemical | 16 |
| butyl carbitol | Van Waters & Rogers | 12 |
| PROJET ® YELLOW OAM dye**** | Zeneca Colors | 40 |
| Dow Corning ® Additive #29***** | Dow Corning Co. | 0.5 |
| roll mill 30 minutes | | |

*molecular weight 18,500
**95 wt. % sulfolane, 5 wt. % water
***75 wt. % acetylethanolamine, 25 wt. % water
****containing 7.5 wt. % Acid Yellow 23 dye in water
*****commercial ASBS'A' block copolymer of polyethyleneoxide/ polydimethylsiloxane/polyethyleneoxide with two terminal hydroxyl groups The yellow ink was filtered through a 0.8 micron Nylon membrane filter before use. The yellow ink had a lower surface tension than the yellow ink in Example III and it dried faster than the yellow ink in Example III without the ASBS'A' block copolymer.

EXAMPLE III

For comparative purposes, a second yellow ink identical to the one described hereinabove except that it contained no ASBS'A' block copolymer (replaced with water) and that the amount of water was increased by 0.5 percent (referred to as Ink B in the table in Example IV below) was also prepared. This yellow ink was also filtered through a 0.8 micron Nylon membrane filter before use.

EXAMPLE IV

The black ink prepared in Example I and the yellow ink prepared in Example II (ink A) were incorporated into a Hewlett-Packard® 855C thermal ink jet printer and used to print images on various plain papers using Auto/Normal mode.

For comparative purposes, the black ink prepared in Example I and the yellow ink prepared in Example III (Ink B) were also incorporated into a Hewlett-Packard® 855C thermal ink jet printer and used to print images on various plain papers using Auto/Normal mode.

Intercolor bleed was measured as a MFLEN value. Intercolor bleed (ICB) usually is caused by undesirable mixing of inks near the bordering areas (adjacent to each other, such as black ink next to yellow ink, and the like) and results in a distorted line image with irregular edges and large MFLEN values. The smaller MFLEN number is desirable because it shows sharper line image with reduced intercolor bleed. The average MFLEN (Mid Frequency Line Edge Noise, Horizontal lines) of the images made with the inks is shown in the table below. The MFLEN number was obtained by equipment consisting of a personal computer, an illuminating light source, a filter, and an imaging microscope with a CDD sensor (light sensor). The equipment was calibrated with a standard image (line with sharp edges and known width). Software using a Fourier Transform technique was used to calculate the MFLEN data and line width. Intercolor bleed data for images generated with the black ink of Example I and the yellow ink of Example II (Ink A) are shown in the second column and intercolor bleed data for images generated with the black ink of Example I and the yellow ink of Example III (Ink B, a control) are shown in the third column:

| Paper | Ink A ICB MFLEN | Ink B ICB MFLEN |
|---|---|---|
| FX "S" Thin Copier Paper 56 gsm | 19.7 | 27.2 |
| FX "L" Copier Paper 63 gsm | 15.8 | 23.4 |
| FX "J" Color Copier Paper 82 gsm | 15.6 | 26.2 |
| FX WR100 (100% Post Waste Paper) 67 gsm | 19.0 | 24.2 |
| Japan Yamayuri Paper | 14.4 | 33.8 |
| Japan Sankoku L Paper | 21.7 | 24.1 |
| Green 100 Paper | 16.8 | 33.8 |
| Xerox ® Image Series Smooth Paper | 12.6 | 15.4 |
| Hammermill Tidal DP, International Paper, Selma, Alabama | 12.6 | 20.8 |
| Average | 16.5 | 25.4 |

As the data indicate, the ink of Example II (Ink A) containing the hydroxyl terminated ethylene oxide/ dimethylsiloxane/ethylene oxide block copolymer exhibited substantially reduced intercolor bleed (lower ICB MFLEN numbers) on all papers compared to the ink (Ink B) containing no hydroxyl terminated ethylene oxide/dimethylsiloxane/ethylene oxide block copolymer. The ink of Example II (Ink A) also generated uniform solid area images and exhibited reduced dry time compared to Ink B (a control).

EXAMPLE V

A black ink was prepared by the method set forth in Example I containing 3.0 parts by weight carbon black (Cab-O-Jet IJX 164), 15 parts by weight sulfolane, 7 parts by weight 2-pyrrolidinone, 0.25 part by weight of the acrylic resin latex (solid content) prepared as described in Example I, 0.5 part by weight Tegopren® 5884, 0.05 part by weight polyethylene oxide, and water (balance to 100). The ink thus prepared was filtered with a one micron glass fiber filter.

EXAMPLE VI

A yellow ink was prepared comprising 20 parts by weight of ProJet® Yellow1G (aqueous solution containing 7.5 wt. % dye solids in water; obtained from Zeneca Colors), 15 parts by weight of Acid Yellow 17 (aqueous solution containing 10 wt. % dye solids in water; obtained from Tricon Colors), 11 parts by weight of Dowanol TPM (tripropylene glycol monomethyl ether, obtained from Dow Chemical Co.), 10 parts by weight of dipropylene glycol, 0.65 part by weight of tris(hydroxymethyl)aminomethane (obtained from American Biorganics), 0.30 part by weight of EDTA (obtained from Dow Chemical Co.), 0.10 part by weight of Dowicil® 150 biocide (obtained from Dow Chemical Co.), 0.05 part by weight of polyethylene oxide (molecular weight 18,500, obtained from Polysciences), and deionized water (balance to 100). The yellow ink was filtered through a 0.8 micron Nylon membrane filter and used as a control (referred to as Ink C in the tables in Example VIII below).

EXAMPLE VII

A yellow ink was prepared comprising 20 parts by weight of ProJet Yellow1G (aqueous solution containing 7.5 wt. % dye solids in water; obtained from Zeneca Colors), 15 parts by weight of Acid Yellow 17 (aqueous solution containing 10 wt. % dye solids in water; obtained from Tricon Colors), 11 parts by weight of Dowanol TPM (tripropylene glycol monomethyl ether, obtained from Dow Chemical Co.), 10 parts by weight of dipropylene glycol, 0.65 part by weight of tris(hydroxymethyl) aminomethane (obtained from American Biorganics), 0.3 part by weight of EDTA (obtained from Dow Chemical Co.), 0.10 part by weight of Dowicil® 150 biocide (obtained from Dow Chemical Co.), 0.05 part by weight of polyethylene oxide (molecular weight 18,500, obtained from Polysciences), 0.5 parts by weight Dow Corning 29 Additive (an ASBS'A' polyethyleneoxide/polydimethylsiloxane/polyethyleneoxide block copolymer with two hydroxyl terminal functional groups), and deionized water (balance to 100). The yellow ink (an ink according to the present invention, referred to as Ink D in the tables in Example VIII below) was filtered through a 0.8 micron Nylon membrane filter.

EXAMPLE VIII

The carbon black ink of Example V (as the "first ink" in a multicolor ink jet printing process) and the yellow ink of Example VI (as the "second ink" in a multicolor ink jet printing process) were incorporated into a thermal ink jet printer (Xerox® XJ6C ink jet printer) and printed on various plain papers. For comparative purposes, the carbon black ink of Example V (as the "first ink" in a multicolor ink jet printing process) and the yellow ink of Example VII (as the "second ink" in a multicolor ink jet printing process) were also incorporated into a thermal ink jet printer (Xerox® XJ6C ink jet printer) and printed on various plain papers under the same conditions.

The intercolor bleed data between the black ink of Example V and the yellow ink of Example VI (Ink C, a control ink) were obtained and compared with that of the black ink of Example V and the yellow ink of Example VII (Ink D, a modified yellow ink comprising an ASBS'A' block copolymer). The intercolor bleed data (ICB) in horizontal and vertical directions were obtained. Horizontal ICB data for these inks is shown in the table below:

| Paper | Ink C ICB MFLEN | Ink D ICB MFLEN |
|---|---|---|
| Recycled Bond paper, Domtar, Cornwall-Ontario | 69.7 | 32.8 |
| Xerox ® Image Series LX | 10.3 | 9.4 |
| Hammermill Tidal DP, International Paper, Selma, Alabama | 20.2 | 16.5 |
| Champion Paper, Brazil | 44 | 14.7 |
| Xerox ® 4024 paper | 84.4 | 28.8 |
| Average | 45.7 | 20.4 |

Vertical ICB data for these inks is shown in the table below:

| Paper | Ink C ICB MFLEN | Ink D ICB MFLEN |
|---|---|---|
| Recycled Bond paper, Domtar, Cornwall-Ontario | 48.9 | 20 |
| Xerox ® Image Series LX | 18.5 | 18.5 |
| Hammermill Tidal DP, International Paper, Selma, Alabama | 21.5 | 14.6 |
| Champion Paper, Brazil | 31.5 | 19.7 |
| Xerox ® 4024 paper | 75.3 | 21 |
| Average | 39.1 | 18.8 |

The intercolor bleed data indicate that the modified yellow ink containing an ASBS'A' block copolymer (Dow Corning Additive 29) (Ink D, an ink according to the present invention) showed reduced intercolor bleed (lower numbers) in both horizontal and vertical directions compared to the ink containing no ASBS'A' block copolymer (Ink C, a control) when printed next to the carbon black ink. Ink D containing the ASBS'A' block copolymer also gave uniform solid area images without mottle and exhibited reduced dry time compared to Ink C containing no ASBS'A' block copolymer.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition comprising water, a colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an monoalkylsiloxane alkyl aryl siloxane, a diarylsiloxane, or mixtures thereof, S is an optional spacer group between the A and B blocks, and S' is an optional spacer group between the B and A' blocks.

2. An ink composition according to claim 1 wherein the S and S' optional spacer groups each, independently of the other, are alkylene groups, alkylene oxide groups, alkylsilyl groups, dialkylsilyl groups, alkylarylsilyl groups, diarylsilyl groups, propylenylalkylsilyl groups, propylenyldialkylsilyl groups, propylenylalkylarylsilyl groups, propylenyldiarylsilyl groups, alkylsiloxy groups, dialkylsiloxy groups, alkylarylsiloxy groups, diarylsiloxy groups, propyleneoxyalkylsilyl groups, propylenylalkylsiloxy groups, propyleneoxydialkylsilyl groups, propylenyldialkylsiloxy groups, propyleneoxyalkylarylsilyl groups, propylenylalkylarylsiloxy groups, propyleneoxydiarylsilyl groups, propylenyldiarylsiloxy groups, heteroatoms, or mixtures thereof.

3. An ink composition according to claim 1 wherein the S and S' optional spacer groups each, independently of the other, are alkylene groups with from 1 to about 10 carbon atoms, alkylene oxide groups with from 1 to about 10 carbon atoms, alkylsilyl groups wherein the alkyl moieties have from 1 to about 10 carbon atoms, dialkylsilyl groups wherein the alkyl moieties have from 1 to about 10 carbon atoms, alkylarylsilyl groups wherein the alkyl moieties have from 1 to about 10 carbon atoms and the aryl moieties have from 6 to about 20 carbon atoms, diarylsilyl groups wherein the aryl moieties have from 6 to about 20 carbon atoms, propylenylalkylsilyl groups wherein the alkyl moieties have from 1 to about 10 carbon atoms, propylenyldialkylsilyl groups wherein the alkyl moieties have from 1 to about 10 carbon atoms, propylenylalkylarylsilyl groups wherein the alkyl moieties have from 1 to about 10 carbon atoms and the aryl moieties have from 6 to about 20 carbon atoms, propylenyldiarylsilyl groups wherein the aryl moieties have from 6 to about 20 carbon atoms, alkylsiloxy groups wherein the alkyl moieties have from 1 to about 10 carbon atoms, dialkylsiloxy groups wherein the alkyl moieties have from 1 to about 10 carbon atoms, alkylarylsiloxy groups wherein the alkyl moieties have from 1 to about 10 carbon atoms and the aryl moieties have from 6 to about 20 carbon atoms, diarylsiloxy groups wherein the aryl moieties have from 6 to about 20 carbon atoms, propyleneoxyalkylsilyl groups wherein the alkyl moieties have from 1 to about 10 carbon atoms, propylenylalkylsiloxy groups wherein the alkyl moieties have from 1 to about 10 carbon atoms, propyleneoxydialkylsilyl groups wherein the alkyl moieties have from 1 to about 10 carbon atoms, propylenyldialkylsiloxy groups wherein the alkyl moieties have from 1 to about 10 carbon atoms, propyleneoxyalkylarylsilyl groups wherein the alkyl moieties have from 1 to about 10 carbon atoms and the aryl moieties have from 6 to about 20 carbon atoms, propylenylalkylarylsiloxy groups wherein the alkyl moieties have from 1 to about 10 carbon atoms and the aryl moieties have from 6 to about 20 carbon atoms, propyleneoxydiarylsilyl groups wherein the aryl moieties have from 6 to about 20 carbon atoms, propylenyldiarylsiloxy groups wherein the aryl moieties have from 6 to about 20 carbon atoms, heteroatoms selected from oxygen, nitrogen, phosphorus, sulfur, or silicon, or mixtures thereof.

4. An ink composition according to claim 1 wherein the S and S' optional spacer groups each, independently of the other, are methylene, ethylene, n-propylene, isopropylene, cyclopropylene, cyclobutylene, cyclopentylene, cyclohexylene, methylene oxide, ethylene oxide, n-propylene oxide, isopropylene oxide, cyclopropylene oxide, cyclobutylene oxide, cyclopentylene oxide, cyclohexylene oxide, dimethylsilyl, methylethylsilyl, methylphenylsilyl, diphenylsilyl, propylenyldimethylsilyl, dimethylsiloxy, methylethylsiloxy, methylphenylsiloxy, diphenylsiloxy, propylenyldimethylsiloxy, oxygen, nitrogen, phosphorus, sulfur, silicon, or mixtures thereof.

5. An ink composition according to claim 1 wherein the block copolymer is of the formula

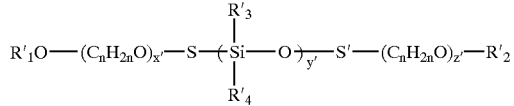

wherein n is 2 or 3 and, within the block copolymer, n has an average value of from about 2 to about 3, $R'_1$, and $R'_2$ each, independently of the other, are hydrogen atoms, alkyl groups, hydroxyalkyl groups, aryl groups, hydroxyaryl groups, or heterocyclic groups, $R'_3$ and $R'_4$ each, independently of the other, is a hydrogen atom, an alkyl group, or an aryl group, with the proviso that $R'_3$ and $R'_4$ cannot both simultaneously be alkyl groups, whether the same or different, x', y', and z' are each integers representing the numbers of repeat monomer units, and S and S' are optional spacer groups.

6. An ink composition according to claim 5 wherein $R'_1$ and $R'_2$ each, independently of the other, are hydrogen atoms, alkyl groups with from 1 to about 30 carbon atoms, hydroxyalkyl groups with from 1 to about 30 carbon atoms, aryl groups with from 6 to about 30 carbon atoms, hydroxyaryl groups with from 6 to about 30 carbon atoms, or heterocyclic groups with from 4 to about 30 carbon atoms wherein the hetero atom is nitrogen, oxygen, sulfur, silicon, or phosphorus, $R'_3$ and $R'_4$ each, independently of the other, is a hydrogen atom, an alkyl group with from 1 to about 10 carbon atoms, or an aryl group with from 6 to about 20 carbon atoms, with the proviso that $R'_3$ and $R'_4$ cannot both simultaneously be alkyl groups, whether the same or different. x' and z' each, independently of the other, are integers from 1 to about 15,000, and y' is an integer of from 1 to about 15,000.

7. An in composition according to claim 1 wherein the block copolymer is of a formula

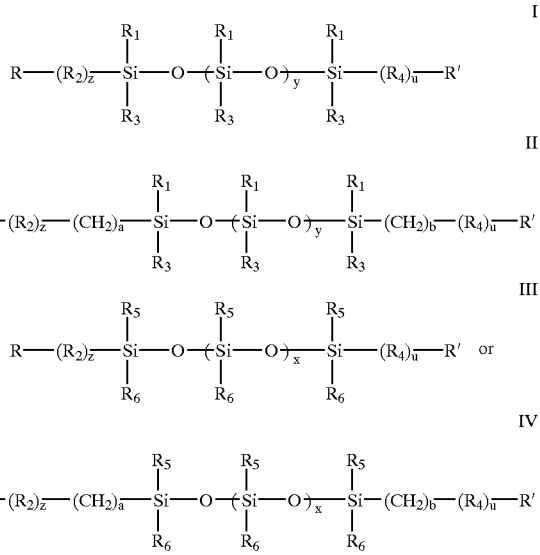

wherein R and R' each, independently of the other, are hydrogen atoms, hydroxyl groups, alkyl groups, hydroxyl-substituted alkyl groups, alkoxy groups, aryl groups, hydroxyl-substituted aryl groups, aryloxy groups, or heterocyclic groups, $R_1$ and $R_3$ each, independently of the other, are hydrogen atoms or alkyl groups with the proviso that $R_1$ and $R_3$ cannot both simultaneously be alkyl groups, whether the same or different, $R_5$ is a hydrogen atom or an alkyl group, $R_6$ is an aryl group, $R_2$ and $R_4$ each, independently of the other, are $(OC_nH_{2n})$ or $(C_nH_{2n}O)$, wherein within each of $R_2$ and $R_4$ n has an average value of from 2 to 3, u and z each, independently of the other, are integers of from 1 to about 15,000, y is an integer of from 1 to about 15,000, x is an integer of from 1 to about 15,000, and a and b each, independently of the other, are integers of from 0 to about 10, wherein the sum of $a+b \geq 2$.

8. An ink composition according to claim 1 wherein the block copolymer is present in the ink in an amount of at least about 0.001 percent by weight of the ink and wherein the block copolymer is present in the ink in an amount of no more than about 8 percent by weight of the ink.

9. An ink composition according to claim 1 wherein the colorant is a dye.

10. An ink composition according to claim 1 wherein the colorant is a pigment.

11. An ink jet printing process which comprises incorporating into an ink jet printing apparatus an ink composition according to claim 1 and causing droplets of the ink composition to be ejected in an imagewise pattern onto a print substrate.

12. An ink jet printing process according to claim 11 wherein the ink jet printing apparatus employs a thermal ink jet process wherein the ink in the nozzles is selectively heated in an imagewise pattern according to digital signals, thereby causing droplets of the ink to be ejected in imagewise pattern onto the print substrate.

13. An ink jet printing process according to claim 11 wherein the ink jet printing apparatus employs a piezoelectric ink jet process.

14. An ink jet printing process according to claim 11 wherein the ink jet printing apparatus employs an acoustic ink jet process wherein droplets of the ink are caused to be ejected in imagewise pattern onto the print substrate by acoustic beams.

15. An ink composition comprising water, a colorant, and a linear ASBS'A' block copolymer wherein R and R' each, independently of the other, are hydrogen atoms, hydroxyl groups, alkyl groups, hydroxyl-substituted alkyl groups, alkoxy groups, aryl groups, hydroxyl-substituted aryl groups, aryloxy groups, or heterocyclic groups, R2 and $R_4$ each, independently of the other, are $(OC_nH_{2n})$ or $(C_nH_{2n}O)$, wherein within each of $R_2$ and $R_4$, n has an average value of from 2 to 3, u and z each, independently of the other, are integers of from 1 to about 15,000, x is an integer of from 1 to about 15,000, and a and b each, independently of the other, are integers of from 0 to about 10, wherein the sum of $a+b \geq 2$, and wherein the block copolymer is of the formula

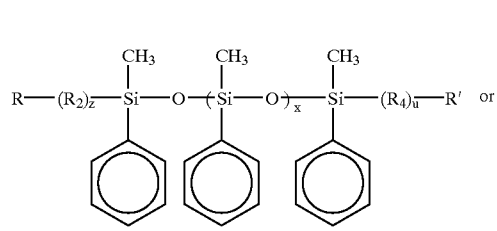

IIIA or

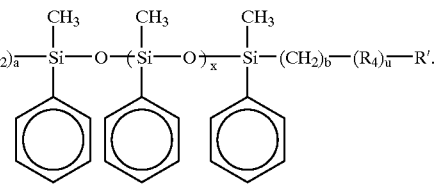

IVA

16. An ink composition according to claim 15 wherein the block copolymer is of the formula

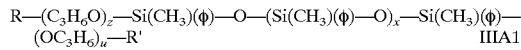   IIIA1

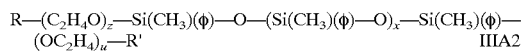   IIIA2

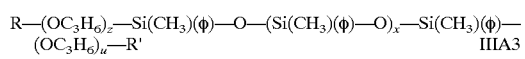   IIIA3

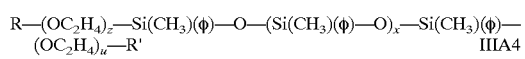   IIIA4

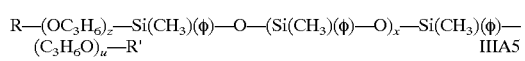   IIIA5

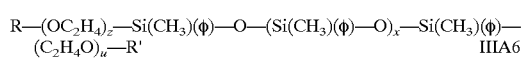   IIIA6

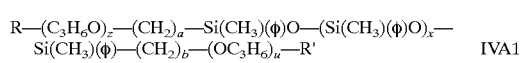   IVA1

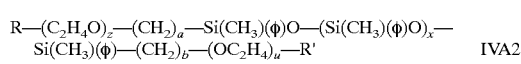   IVA2

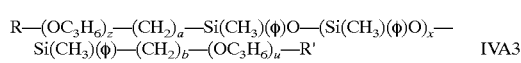   IVA3

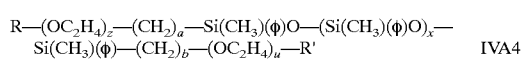   IVA4

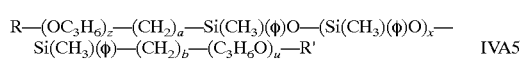   IVA5 or

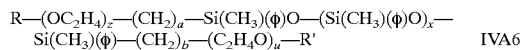   IVA6

17. An ink composition according to claim 16 wherein the block copolymer is of the formula

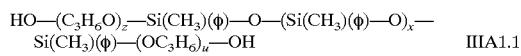   IIIA1.1

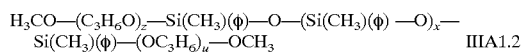   IIIA1.2

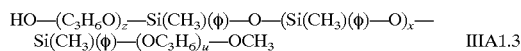   IIIA1.3

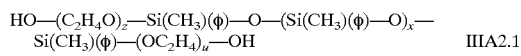   IIIA2.1

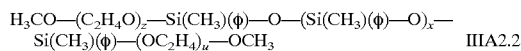   IIIA2.2

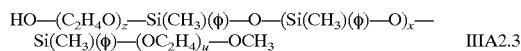   IIIA2.3

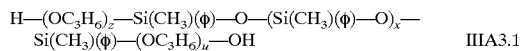   IIIA3.1

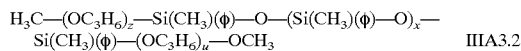   IIIA3.2

H₃C—(OC₃H₆)_z—Si(CH₃)(φ)—O—(Si(CH₃)(φ)—O)_x—
  Si(CH₃)(φ)—(OC₃H₆)_u—OH                                  IIIA3.3

H—(OC₂H₄)_z—Si(CH₃)(φ)—O—(Si(CH₃)(φ)—O)_x—
  Si(CH₃)(φ)—(OC₂H₄)_u—OH                                  IIIA4.1

H₃C—(OC₂H₄)(φ)—Si(CH₃)(φ)—O—(Si(CH₃)(φ)—O)_x—
  Si(CH₃)(φ)—(OC₂H₄)_u—OCH₃                                IIIA4.2

H—(OC₂H₄)_z—Si(CH₃)(φ)—O—(Si(CH₃)(φ)—O)_x—
  Si(CH₃)(φ)—(OC₂H₄)_u—OCH₃                                IIIA4.3

H—(OC₃H₆)_z—Si(CH₃)(φ)—O—(Si(CH₃)(φ)—O)_x—
  Si(CH₃)(φ)—(C₃H₆O)_u—CH                                  IIIA5.1

H₃C—(OC₃H₆)_z—Si(CH₃)(φ)—O—(Si(CH₃)(φ)—O)_x—
  Si(CH₃)(φ)—(C₃H₆O)_u—CH₃                                 IIIA5.2

H—(OC₃H₆)_z—Si(CH₃)(φ)—O—(Si(CH₃)(φ)—O)_x—
  Si(CH₃)(φ)—(C₃H₆O)_u—CH₃                                 IIIA5.3

H—(OC₂H₄)_z—Si(CH₃)(φ)—O—(Si(CH₃)(φ)—O)_x—
  Si(CH₃)(φ)—(C₂H₄O)_u—H                                   IIIA6.1

H₃C—(OC₂H₄)_z—Si(CH₃)(φ)—O—(Si(CH₃)(φ)—O)_x—
  Si(CH₃)(φ)—(C₂H₄O)_u—CH₃                                 IIIA6.2

H—(OC₂H₄)_z—Si(CH₃)(φ)—O—(Si(CH₃)(φ)—O)_x—
  Si(CH₃)(φ)—(C₂H₄O)_u—CH₃                                 IIIA6.3

HO—(C₃H₆O)_z—(CH₂)_a—Si(CH₃)(φ)O—(Si(CH₃)(φ)O)_x—
  Si(CH₃)(φ)—(CH₂)_b—(OC₃H₆)_u—OH                          IVA1.1

H₃CO—(C₃H₆O)_z—(CH₂)_a—Si(CH₃)(φ)O—(Si(CH₃)(φ)O)_x—
  Si(CH₃)(φ)—(CH₂)_b—(OC₃H₆)_u—OCH₃                        IVA1.2

HO—(C₃H₆O)_z—(CH₂)_a—Si(CH₃)(φ)O—(Si(CH₃)(φ)O)_y—
  Si(CH₃)(φ)—(CH₂)_b—(OC₃H₆)_u—OCH₃                        IVA1.3

HO—(C₂H₄O)_z—(CH₂)_a—Si(CH₃)(φ)O—(Si(CH₃)(φ)O)_x—
  Si(CH₃)(φ)—(CH₂)_b—(OC₂H₄)_u—OH                          IVA2.1

H₃CO—(C₂H₄O)_z—(CH₂)_a—Si(CH₃)(φ)O—(Si(CH₃)(φ)O)_x—
  Si(CH₃)(φ)—(CH₂)_b—(OC₂H₄)_u—OCH₃                        IVA2.2

HO—(C₂H₄O)_z—(CH₂)_a—Si(CH₃)(φ)O—(Si(CH₃)(φ)O)_x—
  Si(CH₃)(φ)—(CH₂)_b—(OC₂H₄)_u—OCH₃                        IVA2.3

H—(OC₃H₆)_z—(CH₂)_a—Si(CH₃)(φ)O—(Si(CH₃)(φ)O)_x—
  Si(CH₃)(φ)—(CH₂)_b—(OC₃H₆)_u—OH                          IVA3.1

H₃C—(OC₃H₆)_z—(CH₂)_a—Si(CH₃)(φ)O—(Si(CH₃)(φ)O)_x—
  Si(CH₃)(φ)—(CH₂)_b—(OC₃H₆)_u—OCH₃                        IVA3.2

H₃C—(OC₃H₆)_z—(CH₂)_a—Si(CH₃)(φ)O—(Si(CH₃)(φ)O)_x—
  Si(CH₃)(φ)—(CH₂)_b—(OC₃H₆)_u—OH                          IVA3.3

H—(OC₂H₄)_z—(CH₂)_a—Si(CH₃)(φ)O—(Si(CH₃)(φ)O)_x—
  Si(CH₃)(φ)—(CH₂)_b—(OC₂H₄)_u—OH                          IVA4.1

H₃C—(OC₂H₄)_z—(CH₂)_a—Si(CH₃)(φ)O—(Si(CH₃)(φ)O)_x—
  Si(CH₃)(φ)—(CH₂)_b—(OC₂H₄)_u—OCH                         IVA4.2

H₃C—(OC₂H₄)_z—(CH₂)_a—Si(CH₃)(φ)O—(Si(CH₃)(φ)O)_x—
  Si(CH₃)(φ)—(CH₂)_b—(OC₂H₄)_u—OH                          IVA4.3

H—(OC₃H₆)_z—(CH₂)_a—Si(CH₃)(φ)O—(Si(CH₃)(φ)O)_x—
  Si(CH₃)(φ)—(CH₂)_b—(C₃H₆O)_u—H                           IVA5.1

H₃C—(OC₃H₆)_z—(CH₂)_a—Si(CH₃)(φ)O—(Si(CH₃)(φ)O)_x—
  Si(CH₃)(φ)—(CH₂)_b—(C₃H₆O)_u—CH₃                         IVA5.2

H—(OC₃H₆)_z—(CH₂)_a—Si(CH₃)(φ)O—(Si(CH₃)(φ)O)_x—
  Si(CH₃)(φ)—(CH₂)_b—(C₃H₆O)_u—CH₃                         IVA5.3

H—(OC₂H₄)_z—(CH₂)_a—Si(CH₃)(φ)O—(Si(CH₃)(φ)O)_x—
  Si(CH₃)(φ)—(CH₂)_b—(C₂H₄O)_u—H                           IVA6.1

H₃C—(OC₂H₄)_z—(CH₂)_a—Si(CH₃)(φ)O—(Si(CH₃)(φ)O)_x—
  Si(CH₃)(φ)—(CH₂)_b—(C₂H₄O)_u—CH₃                         IVA6.2 or

H—(OC₂H₄)_z—(CH₂)_a—Si(CH₃)(φ)O—(Si(CH₃)(φ)O)_x—
  Si(CH₃)(φ)—(CH₂)_b—(C₂H₄O)_u—CH₃                         IVA6.3.

18. A set of inks for printing multicolor images in an ink jet printer, said ink set comprising (1) a first ink having a first color and comprising water and a first colorant; and (2) a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is block comprising one or more repeat monomer units of monoalkylsiloxane, an alkyl aryl siloxane, a diarylsiloxane, or mixtures thereof, S is an optional spacer group between the A and B blocks, and S' is an optional spacer group between the B and A' blocks, wherein dry time of the ink containing the block copolymer is decreased and/or intercolor bleed between the first ink and the second ink is reduced when the second ink is printed adjacent to, on top of, or underneath the first ink on a print substrate.

19. A multicolor ink jet printing process which comprises: (1) incorporating into an ink jet printer a first ink having a first color and comprising water and a first colorant; (2) incorporating into the ink jet printer a second ink having a second color different from the first color and comprising water, a second colorant, and a linear ASBS'A' block copolymer wherein A and A' are each, independently of the other, blocks comprising one or more repeat monomer units of ethylene oxide, propylene oxide, or random or alternating mixtures of ethylene oxide and propylene oxide, B is a block comprising one or more repeat monomer units of an monoalkylsiloxane, an alkyl aryl siloxane, a diarylsiloxane, or mixtures thereof, S is an optional spacer group between the A and B blocks, and S' is an optional spacer group between The B and A' blocks: (3) causing droplets of the first ink to be ejected in an imagewise pattern onto a substrate; and (4) causing droplets of the second ink to be ejected in an imagewise pattern onto the substrate, wherein dry time of the ink containing the block copolymer is decreased and/or intercolor bleed between the first ink and the second ink is reduced when the second ink is printed adjacent to, on top of, or underneath the first ink on the substrate.

* * * * *